US012730222B2

(12) United States Patent
Camous et al.

(10) Patent No.: US 12,730,222 B2
(45) Date of Patent: Sep. 8, 2026

(54) MACHINE LEARNING-BASED POINT CLOUD ALIGNMENT CLASSIFICATION

(71) Applicant: Motional AD LLC, Boston, MA (US)

(72) Inventors: Nicole Alexandra Camous, Singapore (SG); Sergi Adipraja Widjaja, Singapore (SG); Taigo Maria Bonanni, Singapore (SG); Venice Erin Baylon Liong, Singapore (SG)

(73) Assignee: Motional AD LLC, Boston, MA (US)

(*) Notice: Subject to any disclaimer, the term of this patent is extended or adjusted under 35 U.S.C. 154(b) by 505 days.

(21) Appl. No.: 17/744,052

(22) Filed: May 13, 2022

(65) Prior Publication Data

US 2023/0074860 A1 Mar. 9, 2023

Related U.S. Application Data

(60) Provisional application No. 63/261,014, filed on Sep. 8, 2021.

(51) Int. Cl.

*G01S 17/89* (2020.01)
*G01S 17/931* (2020.01)
(Continued)

(52) U.S. Cl.

CPC ............ *G01S 17/89* (2013.01); *G01S 17/931* (2020.01); *G06V 10/764* (2022.01); (Continued)

(58) Field of Classification Search

CPC .. B60W 2420/408; G01S 17/86; G01S 17/89; G06V 10/74; G06V 10/764; G06V 10/7715; G06V 10/809; G06V 10/82

See application file for complete search history.

(56) References Cited

U.S. PATENT DOCUMENTS

| | | | | |
|---|---|---|---|---|
| 10,841,483 | B1 * | 11/2020 | Hunt | G06T 7/13 |
| 11,214,281 | B2 | 1/2022 | Vora et al. | |

(Continued)

FOREIGN PATENT DOCUMENTS

| | | | |
|---|---|---|---|
| CN | 113096167 | A | 7/2021 |
| JP | 2019-015606 | A | 1/2019 |
| WO | WO 2021/138618 | A1 | 7/2021 |

OTHER PUBLICATIONS

Lang, A. et al., "PointPillars: Fast Encoders for Object Detection from Point Clouds", CVPR 2019, May 2019, arXiv:1812.05784v2, in 9 pages.

(Continued)

*Primary Examiner* — Kyle R Quigley

(74) *Attorney, Agent, or Firm* — Knobbe, Martens, Olson & Bear, LLP

(57) ABSTRACT

Provided are methods, systems, and computer program products for machine-learning based point cloud alignment classification. An example method may include: obtaining at least two light detection and ranging (LiDAR) point clouds; processing the at least two LiDAR point clouds using at least one classifier network; obtaining at least one output dataset from the at least one classifier network; determining that the at least two LiDAR point clouds are misaligned based on the at least one output dataset; and performing a first action based on the determining that the at least two LiDAR point clouds are misaligned.

19 Claims, 15 Drawing Sheets

(51) Int. Cl.

| | |
|---|---|
| ***G06V 10/764*** | (2022.01) |
| ***G06V 10/77*** | (2022.01) |
| ***G06V 10/80*** | (2022.01) |
| ***G06V 10/82*** | (2022.01) |
| *B60W 60/00* | (2020.01) |

(52) U.S. Cl.

CPC ........ *G06V 10/7715* (2022.01); *G06V 10/809* (2022.01); *G06V 10/82* (2022.01); *B60W 60/001* (2020.02); *B60W 2420/408* (2024.01)

(56) References Cited

U.S. PATENT DOCUMENTS

| | | | | |
|---|---|---|---|---|
| 2017/0046840 | A1 | 2/2017 | Chen et al. | |
| 2018/0196127 | A1* | 7/2018 | Harada | G01S 7/497 |
| 2019/0004160 | A1 | 1/2019 | Lee et al. | |
| 2019/0271780 | A1 | 9/2019 | Bravo Orellana et al. | |
| 2019/0384274 | A1* | 12/2019 | Bharadwaj | G05B 19/4099 |
| 2019/0387216 | A1* | 12/2019 | Hicks | G01S 17/10 |
| 2020/0018852 | A1* | 1/2020 | Walls | G01S 7/4972 |
| 2020/0174107 | A1* | 6/2020 | Briggs | H04N 23/90 |
| 2021/0342609 | A1* | 11/2021 | Smolyanskiy | B60W 60/0027 |
| 2021/0350147 | A1 | 11/2021 | Yuan et al. | |
| 2022/0043152 | A1* | 2/2022 | Li | G01S 17/66 |
| 2022/0179083 | A1* | 6/2022 | Wolke | G06T 7/001 |
| 2022/0244395 | A1* | 8/2022 | Chen | G01S 7/003 |
| 2022/0406010 | A1* | 12/2022 | Radha | G01S 17/42 |
| 2023/0072682 | A1* | 3/2023 | Jeong | G01S 17/89 |

OTHER PUBLICATIONS

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.

Thomas, H. et al., "KPConv: Flexible and Deformable Convolution for Point Clouds", Proceedings of the IEEE International Conference on Computer Vision 2019, Aug. 2019, in 15 pages.

Great Britain Office Action issued for Application No. GB 2212956.3, dated Mar. 7, 2023.

Great Britain Office Action issued for Application No. GB 2212956.3, dated Jul. 31, 2024.

Korean Office Action issued for Application No. KR 10-2022-0113958, dated Jan. 20, 2025.

Great Britain Office Action issued for GB Application No. 2212956.3, mailed Sep. 30, 2025.

Notice of Allowance received for KR Application No. 10-2022-0113958, mailed Oct. 10, 2025.

* cited by examiner

MACHINE LEARNING-BASED POINT CLOUD ALIGNMENT CLASSIFICATION

CROSS-REFERENCE TO RELATED APPLICATION(S)

This application claims the benefit of U.S. Provisional Patent Application No. 63/261,014, filed Sep. 8, 2021, entitled "MACHINE LEARNING-BASED POINT CLOUD ALIGNMENT CLASSIFICATION," the entire contents of which are hereby incorporated by reference.

BACKGROUND

Self-driving vehicles typically use Lidar imaging to map segments of maps for use in navigation. Generally, point cloud registration is the problem of maximally aligning two (or more) point clouds that are partially observing the same scene, in order to map segments of maps. Registration algorithms aim to return a rigid transformation that best aligns the input point clouds. Due to noise affecting the data and the probabilistic nature of the problem, registration approaches, e.g., using geometric techniques, are not guaranteed to converge to an optimal solution. Convergence to non-optimal solutions may results in artifacts in the mapped segment. Non-limiting examples of such artifacts may include double walls or blurry areas. Artifacts in the mapped segment may reduce the consistency of a reconstruction and the reconstruction's usability in the autonomous vehicle domain.

Detection of map artifacts in the early stages of a mapping pipeline is the key to a streamlined, cost-effective process. Usually, misalignments are detected through visual inspection by a human in the loop. Generally, visual inspection by a human in the loop may be: expensive (e.g., capital intensive to train/employ humans for this task); error-prone (e.g., human error, reliant on human sensing of point clouds in 2D space); inconsistent (e.g., different subjective perception between humans); and difficult to scale (e.g., not suitable for city-scale, or larger, maps).

DETAILED DESCRIPTION

Figure 1:
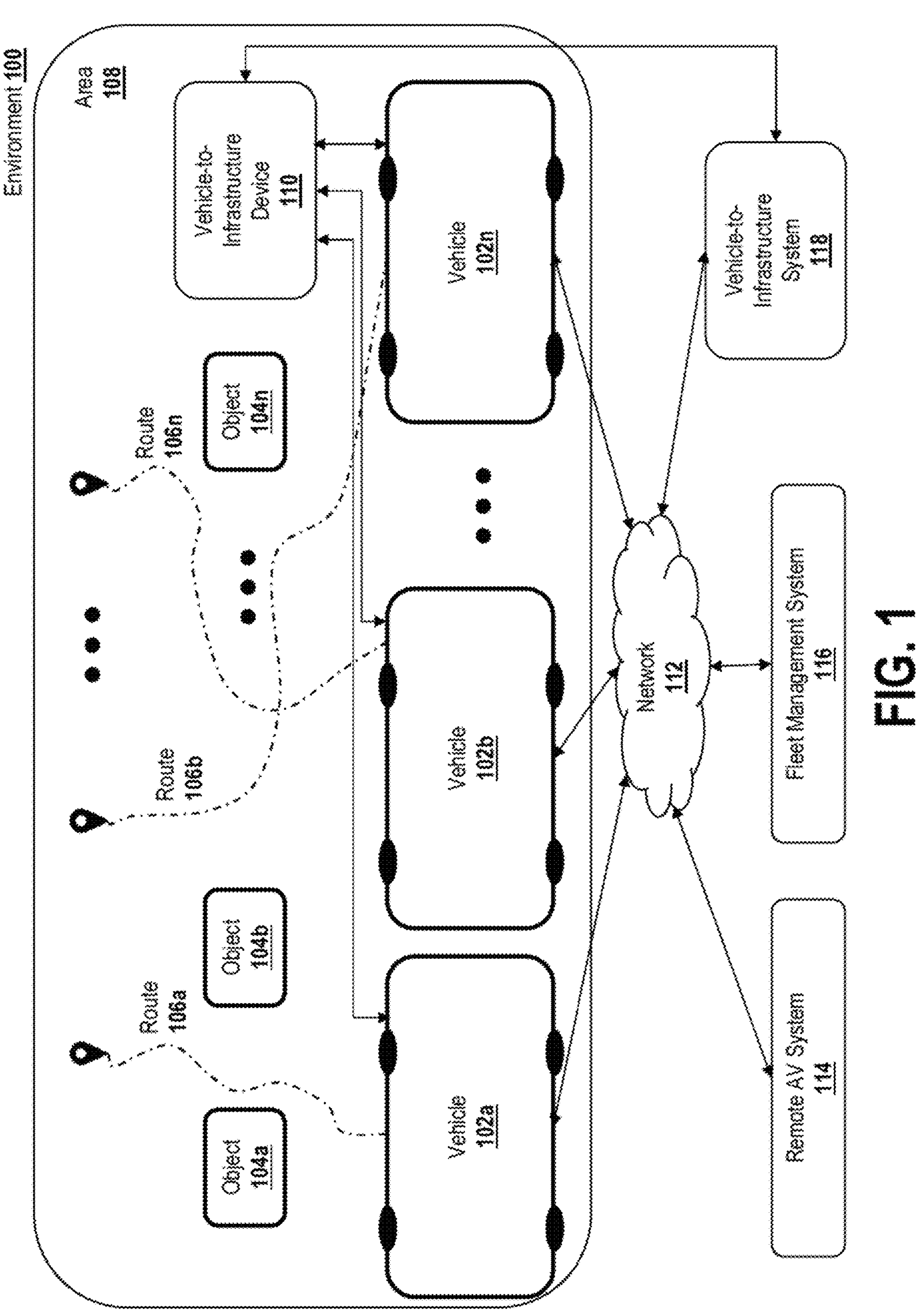
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement a classifier system. As a non-limiting example, the classifier system may obtain a pair of LiDAR point clouds; process the pair of LiDAR point clouds through a classifier network. The classifier network may extract features from the pair of LiDAR point clouds, and compute a probability score of the pair of LiDAR point clouds being aligned or misaligned.

By virtue of the implementation of systems, methods, and computer program products described herein, an autonomous vehicle or AV system can avoid using human in the loop artifact detection. Therefore, systems of the present disclosure may be less expensive (e.g., avoid capital investment to train/employ humans for this task); less error-prone (e.g., avoid human error, have pixel level sensing of point clouds in 2D/3D space); more consistent (e.g., avoid different subjective perception between humans); and scale with computational resources (e.g., suitable for city-scale, or larger, maps).

Referring now to FIG. 1, illustrated is example environment 100 in which vehicles that include autonomous systems, as well as vehicles that do not, are operated. As illustrated, environment 100 includes vehicles 102*a*-102*n*, objects 104*a*-104*n*, routes 106*a*-106*n*, area 108, vehicle-to-infrastructure (V2I) device 110, network 112, remote autonomous vehicle (AV) system 114, fleet management system 116, and V2I system 118. Vehicles 102*a*-102*n*, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104*a*-104*n* interconnect with at least one of vehicles 102*a*-102*n*, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102*a*-102*n* (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106*a*-106*n* (referred to individually as route 106 and collectively as routes 106), as described herein. In some embodiments, one or more vehicles 102 include an autonomous system (e.g., an autonomous system that is the same as or similar to autonomous system 202).

Objects 104*a*-104*n* (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106*a*-106*n* (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g., a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high-level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high-level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
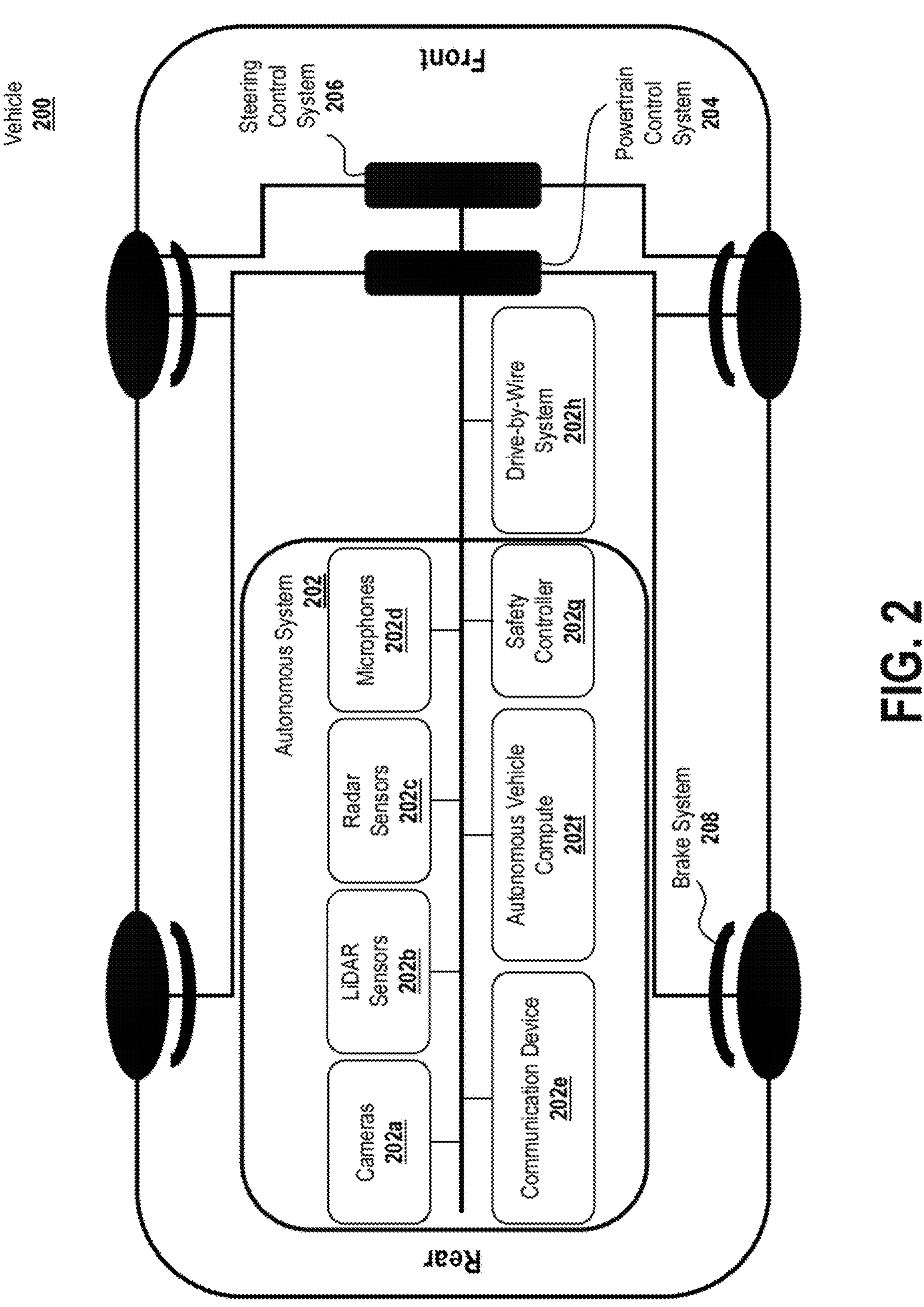
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202*a*, LiDAR sensors 202*b*, radar sensors 202*c*, and microphones 202*d*. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202*e*, autonomous vehicle compute 202*f*, and drive-by-wire (DBW) system 202*h*.

Figure 3:
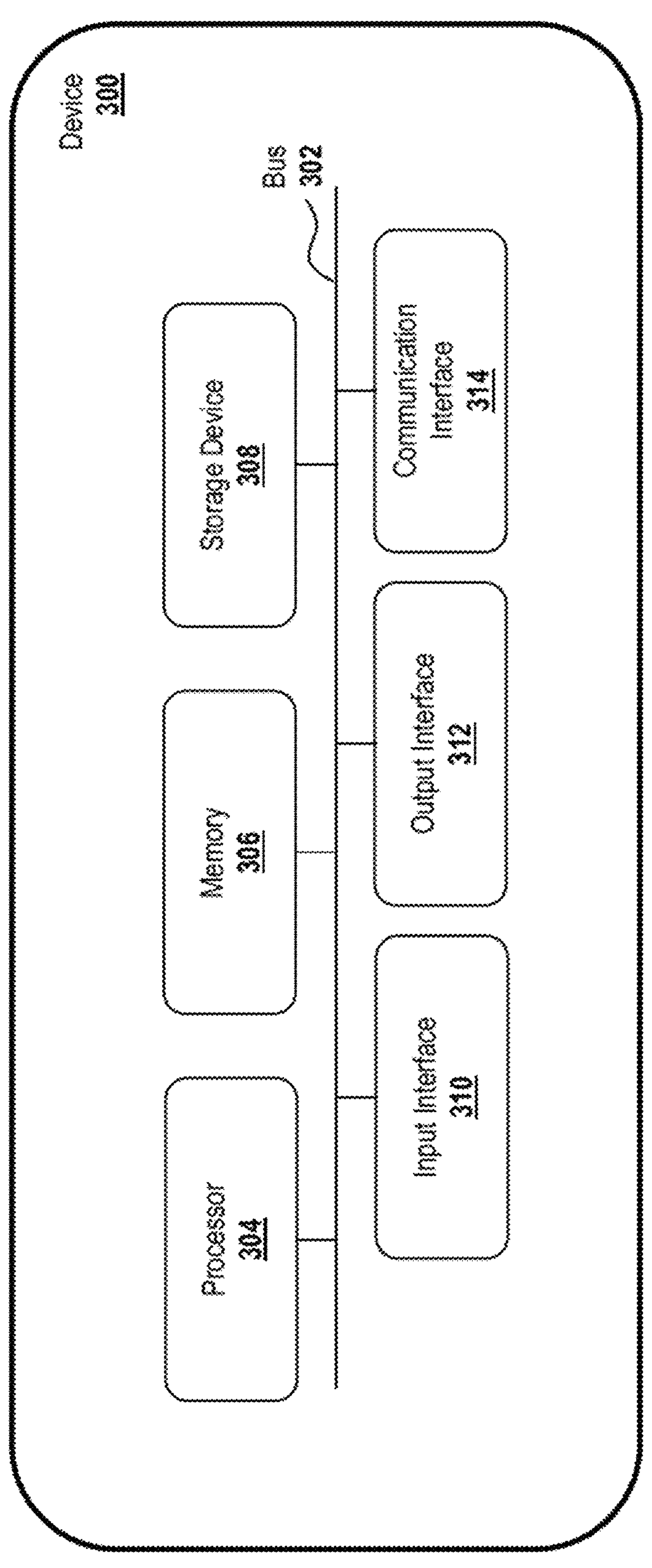
FIG. 3 is a diagram of components of one or more devices and/or one or more systems of FIGS. 1 and 2.

Cameras 202*a* include at least one device configured to be in communication with communication device 202*e*, autonomous vehicle compute 202*f*, and/or safety controller 202*g* via a bus (e.g., a bus that is the same as or similar to bus 302 of FIG. 3). Cameras 202*a* include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202*a* generates camera data as output. In some examples, camera 202*a* generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202*a* includes a plurality of independent cameras configured on (e.g., positioned on) a vehicle to capture images for the purpose of stereopsis (stereo vision). In some examples, camera 202*a* includes a plurality of cameras that generate image data and transmit the image data to autonomous vehicle compute 202*f* and/or a fleet management system (e.g., a fleet management system that is the same as or similar to fleet management system 116 of FIG. 1). In such an example, autonomous vehicle compute 202*f* determines depth to one or more objects in a field of view of at least two cameras of the plurality of cameras based on the image data from the at least two cameras. In some embodiments, cameras 202*a* is configured to capture images of objects within a distance from cameras 202*a* (e.g., up to 100 meters, up to a kilometer, and/or the like). Accordingly, cameras 202*a* include features such as sensors and lenses that are optimized for perceiving objects that are at one or more distances from cameras 202*a*.

In an embodiment, camera 202*a* includes at least one camera configured to capture one or more images associated with one or more traffic lights, street signs and/or other physical objects that provide visual navigation information. In some embodiments, camera 202*a* generates traffic light data (TLD data) associated with one or more images. In some examples, camera 202*a* generates TLD data associated with one or more images that include a format (e.g., RAW, JPEG, PNG, and/or the like). In some embodiments, camera 202*a* that generates TLD data differs from other systems described herein incorporating cameras in that camera 202*a* can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202*b* include at least one device configured to be in communication with communication device 202*e*, autonomous vehicle compute 202*f*, and/or safety controller 202*g* via a bus (e.g., a bus that is the same as or similar to bus 302 of FIG. 3). LiDAR sensors 202*b* include a system configured to transmit light from a light emitter (e.g., a laser transmitter). Light emitted by LiDAR sensors 202*b* include light (e.g., infrared light and/or the like) that is outside of the visible spectrum. In some embodiments, during operation, light emitted by LiDAR sensors 202*b* encounters a physical object (e.g., a vehicle) and is reflected back to LiDAR sensors 202*b*. In some embodiments, the light emitted by LiDAR sensors 202*b* does not penetrate the physical objects that the light encounters. LiDAR sensors 202*b* also include at least one light detector which detects the light that was emitted from the light emitter after the light encounters a physical object. In some embodiments, at least one data processing system associated with LiDAR sensors 202*b* generates an image (e.g., a point cloud, a combined point cloud, and/or the like) representing the objects included in a field of view of LiDAR sensors 202*b*. In some examples, the at least one data processing system associated with LiDAR sensor 202*b* generates an image that represents the boundaries of a physical object, the surfaces (e.g., the topology of the surfaces) of the physical object, and/or the like. In such an example, the image is used to determine the boundaries of physical objects in the field of view of LiDAR sensors 202*b*.

Radio Detection and Ranging (radar) sensors 202*c* include at least one device configured to be in communication with communication device 202*e*, autonomous vehicle compute 202*f*, and/or safety controller 202*g* via a bus (e.g., a bus that is the same as or similar to bus 302 of FIG. 3). Radar sensors 202*c* include a system configured to transmit radio waves (either pulsed or continuously). The radio waves transmitted by radar sensors 202*c* include radio waves that are within a predetermined spectrum. In some embodiments, during operation, radio waves transmitted by radar sensors 202*c* encounter a physical object and are reflected back to radar sensors 202*c*. In some embodiments, the radio waves transmitted by radar sensors 202*c* are not reflected by some objects. In some embodiments, at least one data processing system associated with radar sensors 202*c* generates signals representing the objects included in a field of view of radar sensors 202*c*. For example, the at least one data processing system associated with radar sensor 202*c* generates an image that represents the boundaries of a physical object, the surfaces (e.g., the topology of the surfaces) of the physical object, and/or the like. In some examples, the image is used to determine the boundaries of physical objects in the field of view of radar sensors 202*c*.

Microphones 202*d* includes at least one device configured to be in communication with communication device 202*e*, autonomous vehicle compute 202*f*, and/or safety controller 202*g* via a bus (e.g., a bus that is the same as or similar to bus 302 of FIG. 3). Microphones 202*d* include one or more microphones (e.g., array microphones, external microphones, and/or the like) that capture audio signals and generate data associated with (e.g., representing) the audio signals. In some examples, microphones 202*d* include transducer devices and/or like devices. In some embodiments, one or more systems described herein can receive the data generated by microphones 202*d* and determine a position of an object relative to vehicle 200 (e.g., a distance and/or the like) based on the audio signals associated with the data.

Communication device 202*e* include at least one device configured to be in communication with cameras 202*a*, LiDAR sensors 202*b*, radar sensors 202*c*, microphones 202*d*, autonomous vehicle compute 202*f*, safety controller 202*g*, and/or DBW system 202*h*. For example, communication device 202*e* may include a device that is the same as or similar to communication interface 314 of FIG. 3. In some embodiments, communication device 202*e* includes a vehicle-to-vehicle (V2V) communication device (e.g., a device that enables wireless communication of data between vehicles).

Autonomous vehicle compute 202*f* include at least one device configured to be in communication with cameras 202*a*, LiDAR sensors 202*b*, radar sensors 202*c*, microphones 202*d*, communication device 202*e*, safety controller 202*g*, and/or DBW system 202*h*. In some examples, autonomous vehicle compute 202*f* includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle compute 202*f* is the same as or similar to autonomous vehicle compute 400, described herein. Additionally, or alternatively, in some embodiments autonomous vehicle compute 202*f* is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202*g* includes at least one device configured to be in communication with cameras 202*a*, LiDAR sensors 202*b*, radar sensors 202*c*, microphones 202*d*, communication device 202*e*, autonomous vehicle computer 202*f*, and/or DBW system 202*h*. In some examples, safety controller 202*g* includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202*g* is configured to generate control signals that take precedence over (e.g., overrides) control signals generated and/or transmitted by autonomous vehicle compute 202*f*.

DBW system 202*h* includes at least one device configured to be in communication with communication device 202*e* and/or autonomous vehicle compute 202*f*. In some examples, DBW system 202*h* includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202*h* are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202*h*. In some examples, powertrain control system 204 includes at least one controller, actuator, and/or the like. In some embodiments, powertrain control system 204 receives control signals from DBW system 202*h* and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), and/or one or more devices of network 112 (e.g., one or more devices of a system of network 112). In some embodiments, one or more devices of vehicles 102 (e.g., one or more devices of a system of vehicles 102), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid-state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally, or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally, or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally, or alternatively, a set of components (e.g., one or more components) of device 300 can perform one or more functions described as being performed by another component or another set of components of device 300.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute **202*f* of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118**, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202*a*), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202*b*). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202*h*, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like). An example of an implementation of a machine learning model is included below with respect to FIGS. 4B-4D.

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202*b*) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 4A:
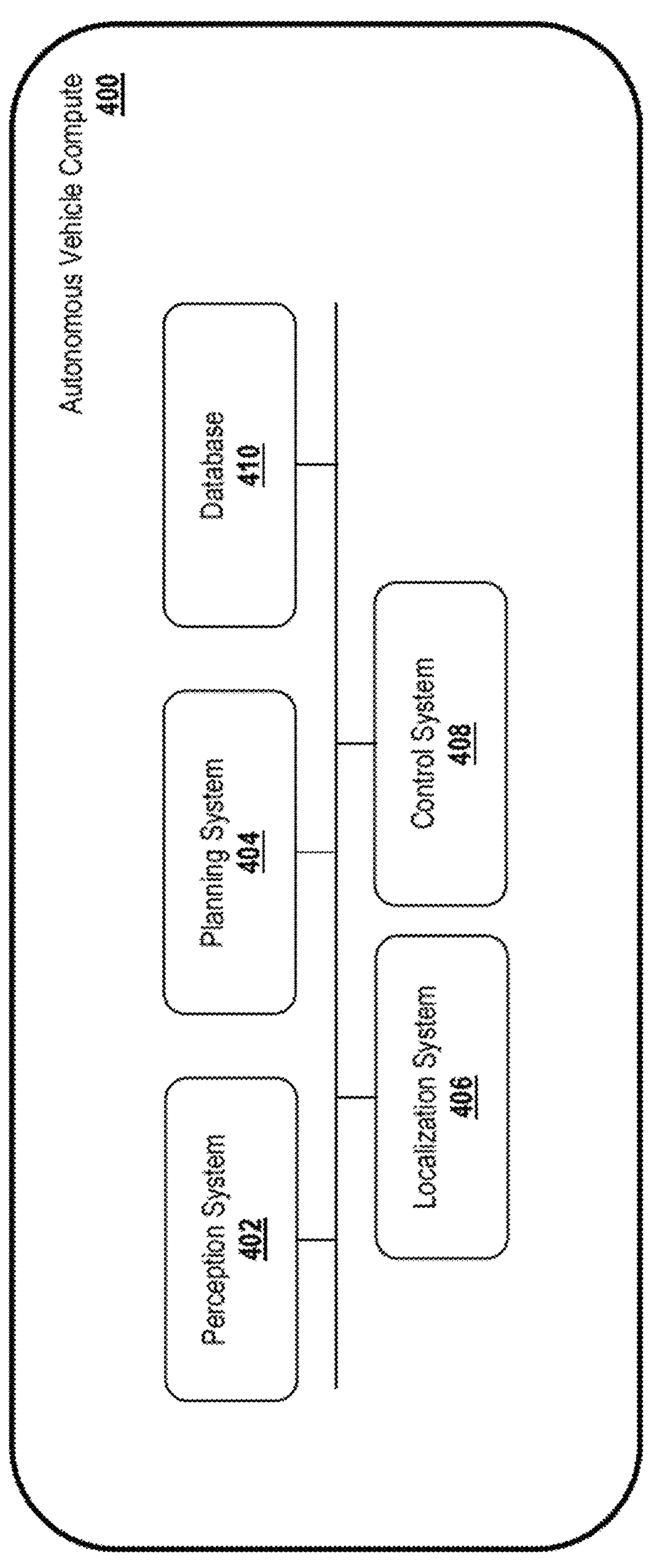
FIG. 4A is a diagram of certain components of an autonomous system.
Figure 4B:
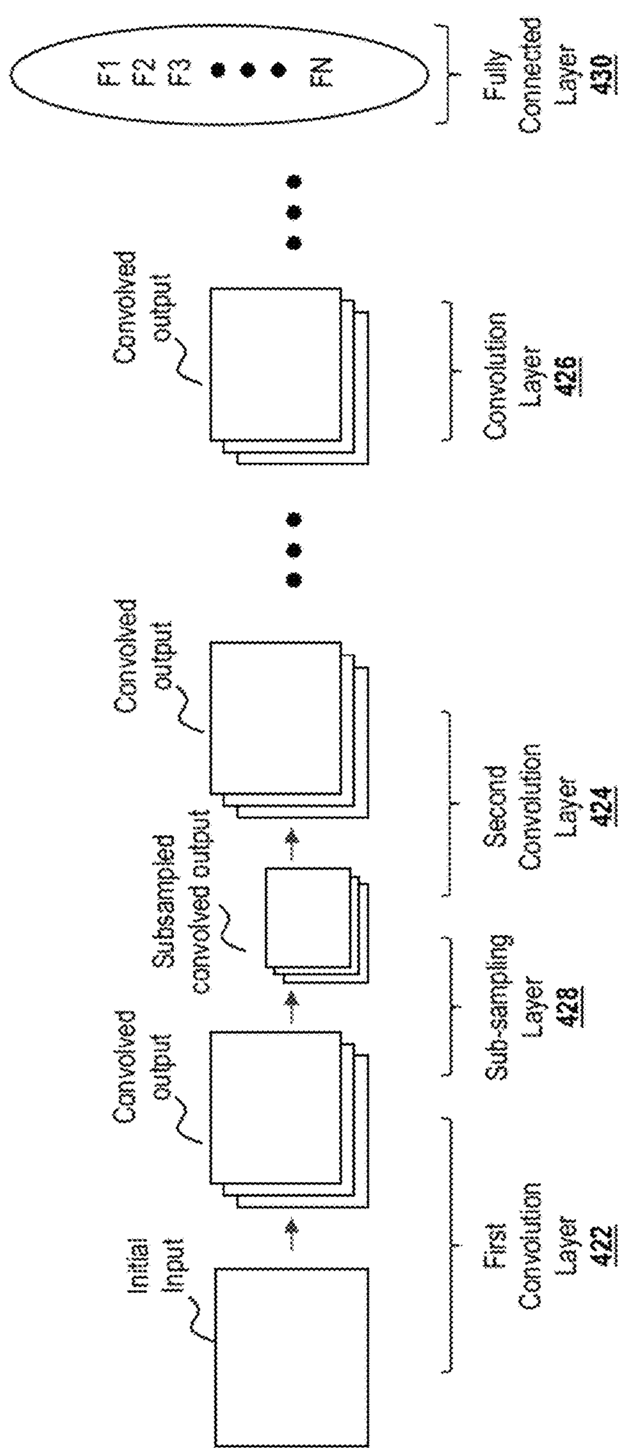
FIG. 4B is a diagram of an implementation of a neural network.

Referring now to FIG. 4B, illustrated is a diagram of an implementation of a machine learning model. More specifically, illustrated is a diagram of an implementation of a convolutional neural network (CNN) 420. For purposes of illustration, the following description of CNN 420 will be with respect to an implementation of CNN 420 by perception system 402. However, it will be understood that in some examples CNN 420 (e.g., one or more components of CNN 420) is implemented by other systems different from, or in addition to, perception system 402 such as planning system 404, localization system 406, and/or control system 408. While CNN 420 includes certain features as described herein, these features are provided for the purpose of illustration and are not intended to limit the present disclosure.

CNN 420 includes a plurality of convolution layers including first convolution layer 422, second convolution layer 424, and convolution layer 426. In some embodiments, CNN 420 includes sub-sampling layer 428 (sometimes referred to as a pooling layer). In some embodiments, sub-sampling layer 428 and/or other subsampling layers have a dimension (i.e., an amount of nodes) that is less than a dimension of an upstream system. By virtue of sub-sampling layer 428 having a dimension that is less than a dimension of an upstream layer, CNN 420 consolidates the amount of data associated with the initial input and/or the output of an upstream layer to thereby decrease the amount of computations necessary for CNN 420 to perform downstream convolution operations. Additionally, or alternatively, by virtue of sub-sampling layer 428 being associated with (e.g., configured to perform) at least one subsampling function (as described below with respect to FIGS. 4C and 4D), CNN 420 consolidates the amount of data associated with the initial input.

Perception system 402 performs convolution operations based on perception system 402 providing respective inputs and/or outputs associated with each of first convolution layer 422, second convolution layer 424, and convolution layer 426 to generate respective outputs. In some examples, perception system 402 implements CNN 420 based on perception system 402 providing data as input to first convolution layer 422, second convolution layer 424, and convolution layer 426. In such an example, perception system 402 provides the data as input to first convolution layer 422, second convolution layer 424, and convolution layer 426 based on perception system 402 receiving data from one or more different systems (e.g., one or more systems of a vehicle that is the same as or similar to vehicle 102), a remote AV system that is the same as or similar to remote AV system 114, a fleet management system that is the same as or similar to fleet management system 116, a V2I system that is the same as or similar to V2I system 118, and/or the like). A detailed description of convolution operations is included below with respect to FIG. 4C.

In some embodiments, perception system 402 provides data associated with an input (referred to as an initial input) to first convolution layer 422 and perception system 402 generates data associated with an output using first convolution layer 422. In some embodiments, perception system 402 provides an output generated by a convolution layer as input to a different convolution layer. For example, perception system 402 provides the output of first convolution layer 422 as input to sub-sampling layer 428, second convolution layer 424, and/or convolution layer 426. In such an example, first convolution layer 422 is referred to as an upstream layer and sub-sampling layer 428, second convolution layer 424, and/or convolution layer 426 are referred to as downstream layers. Similarly, in some embodiments perception system 402 provides the output of sub-sampling layer 428 to second convolution layer 424 and/or convolution layer 426 and, in this example, sub-sampling layer 428 would be referred to as an upstream layer and second convolution layer 424 and/or convolution layer 426 would be referred to as downstream layers.

In some embodiments, perception system 402 processes the data associated with the input provided to CNN 420 before perception system 402 provides the input to CNN 420. For example, perception system 402 processes the data associated with the input provided to CNN 420 based on perception system 402 normalizing sensor data (e.g., image data, LiDAR data, radar data, and/or the like).

In some embodiments, CNN 420 generates an output based on perception system 402 performing convolution operations associated with each convolution layer. In some examples, CNN 420 generates an output based on perception system 402 performing convolution operations associated with each convolution layer and an initial input. In some embodiments, perception system 402 generates the output and provides the output as fully connected layer 430. In some examples, perception system 402 provides the output of convolution layer 426 as fully connected layer 430, where fully connected layer 430 includes data associated with a plurality of feature values referred to as F1, F2 . . . FN. In this example, the output of convolution layer 426 includes data associated with a plurality of output feature values that represent a prediction.

In some embodiments, perception system 402 identifies a prediction from among a plurality of predictions based on perception system 402 identifying a feature value that is associated with the highest likelihood of being the correct prediction from among the plurality of predictions. For example, where fully connected layer 430 includes feature values F1, F2, . . . FN, and F1 is the greatest feature value, perception system 402 identifies the prediction associated with F1 as being the correct prediction from among the plurality of predictions. In some embodiments, perception system 402 trains CNN 420 to generate the prediction. In some examples, perception system 402 trains CNN 420 to generate the prediction based on perception system 402 providing training data associated with the prediction to CNN 420.

Figure 4C:
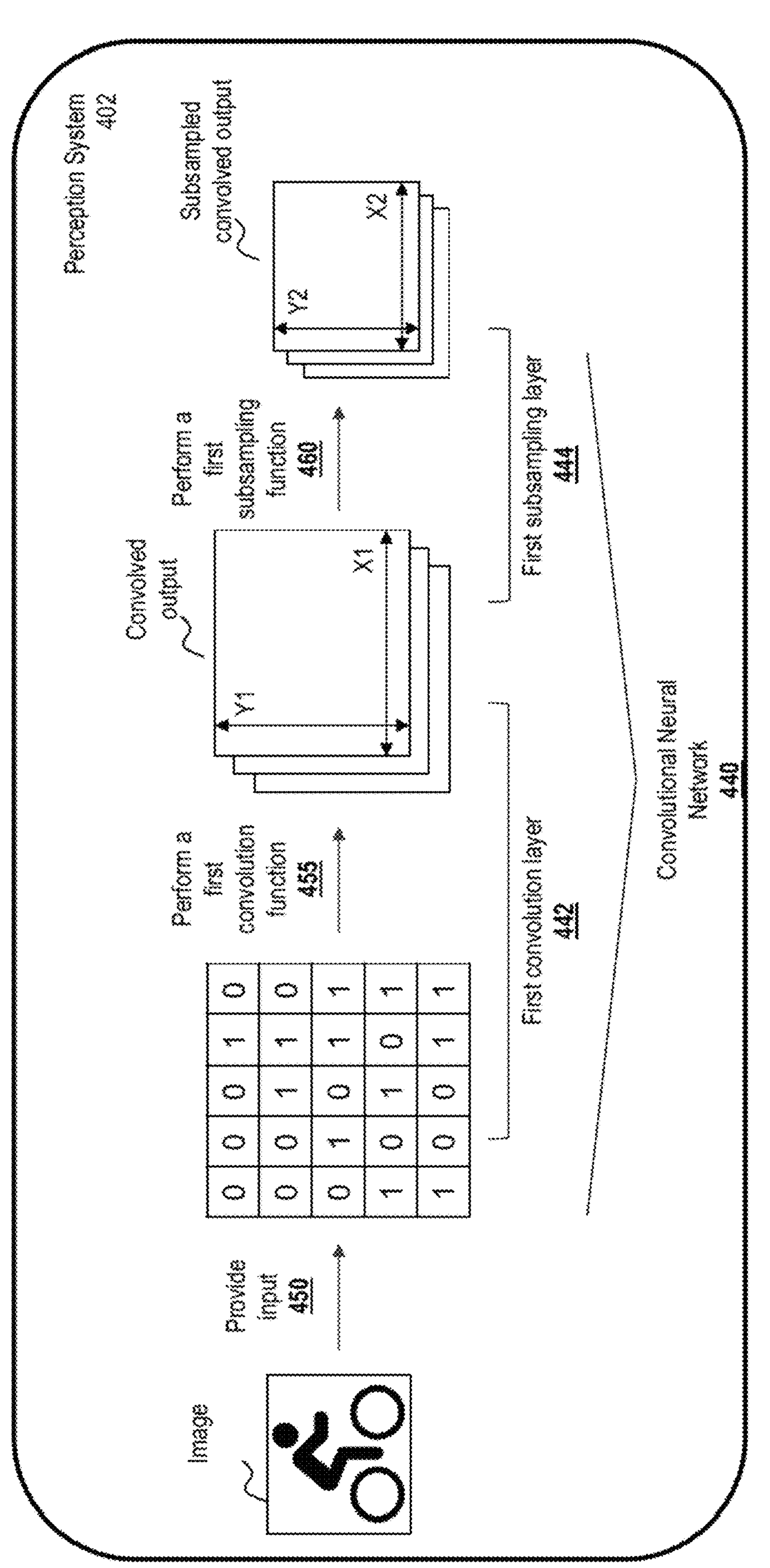
FIGS. 4C and 4D are a diagram illustrating example operation of a CNN.
Figure 4D:
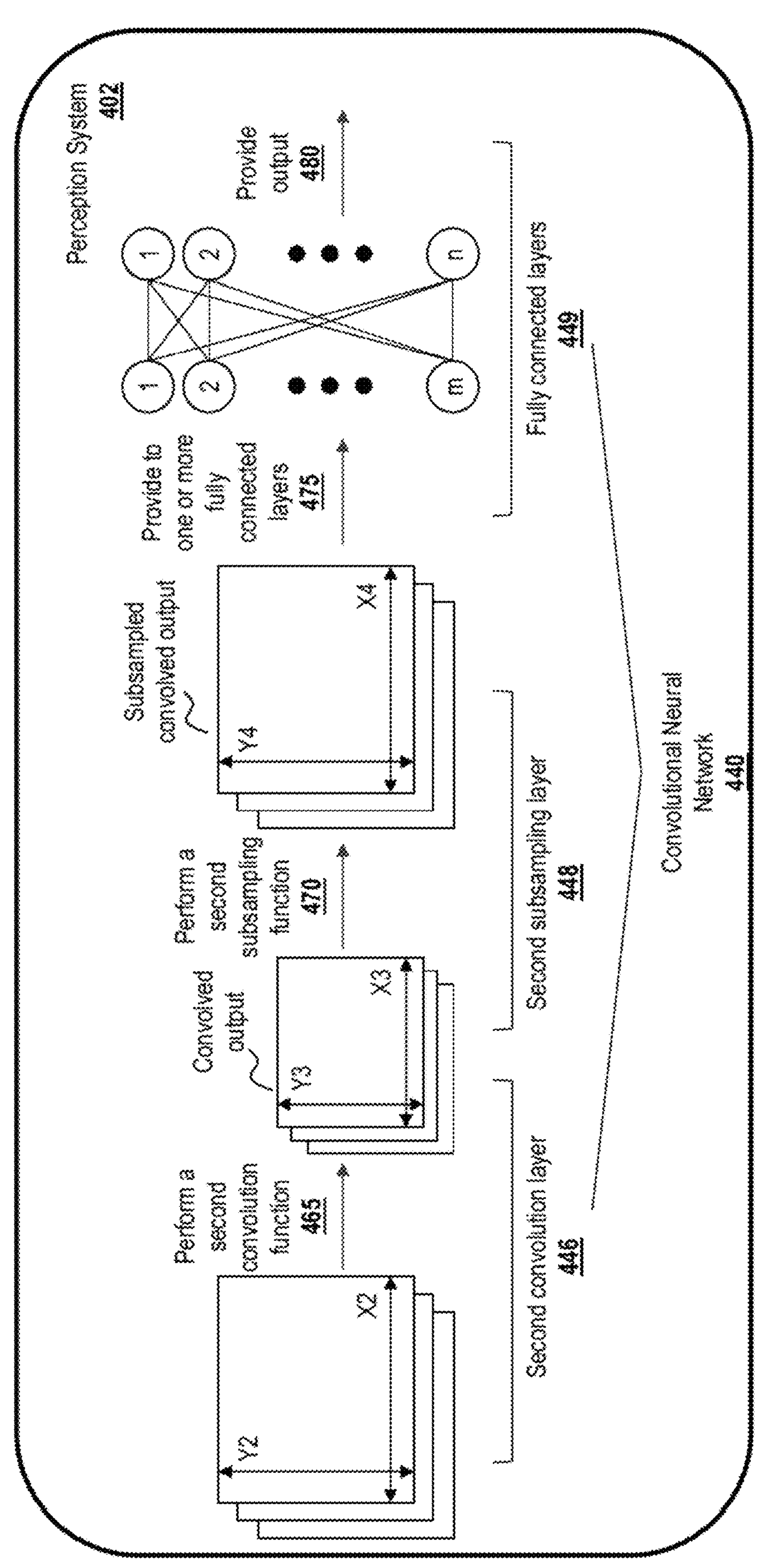

Referring now to FIGS. 4C and 4D, illustrated is a diagram of example operation of CNN 440 by perception system 402. In some embodiments, CNN 440 (e.g., one or more components of CNN 440) is the same as, or similar to, CNN 420 (e.g., one or more components of CNN 420) (see FIG. 4B).

At step 450, perception system 402 provides data associated with an image as input to CNN 440 (step 450). For example, as illustrated, perception system 402 provides the data associated with the image to CNN 440, where the image is a greyscale image represented as values stored in a two-dimensional (2D) array. In some embodiments, the data associated with the image may include data associated with a color image, the color image represented as values stored in a three-dimensional (3D) array. Additionally, or alternatively, the data associated with the image may include data associated with an infrared image, a radar image, and/or the like.

At step 455, CNN 440 performs a first convolution function. For example, CNN 440 performs the first convolution function based on CNN 440 providing the values representing the image as input to one or more neurons (not explicitly illustrated) included in first convolution layer 442. In this example, the values representing the image can correspond to values representing a region of the image (sometimes referred to as a receptive field). In some embodiments, each neuron is associated with a filter (not explicitly illustrated). A filter (sometimes referred to as a kernel) is representable as an array of values that corresponds in size to the values provided as input to the neuron. In one example, a filter may be configured to identify edges (e.g., horizontal lines, vertical lines, straight lines, and/or the like). In successive convolution layers, the filters associated with neurons may be configured to identify successively more complex patterns (e.g., arcs, objects, and/or the like).

In some embodiments, CNN 440 performs the first convolution function based on CNN 440 multiplying the values provided as input to each of the one or more neurons included in first convolution layer 442 with the values of the filter that corresponds to each of the one or more neurons. For example, CNN 440 can multiply the values provided as input to each of the one or more neurons included in first convolution layer 442 with the values of the filter that corresponds to each of the one or more neurons to generate a single value or an array of values as an output. In some embodiments, the collective output of the neurons of first convolution layer 442 is referred to as a convolved output. In some embodiments, where each neuron has the same filter, the convolved output is referred to as a feature map.

In some embodiments, CNN 440 provides the outputs of each neuron of first convolutional layer 442 to neurons of a downstream layer. For purposes of clarity, an upstream layer can be a layer that transmits data to a different layer (referred to as a downstream layer). For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of first subsampling layer 444. In some embodiments, CNN 440 adds a bias value to the aggregates of all the values provided to each neuron of the downstream layer. For example, CNN 440 adds a bias value to the aggregates of all the values provided to each neuron of first subsampling layer 444. In such an example, CNN 440 determines a final value to provide to each neuron of first subsampling layer 444 based on the aggregates of all the values provided to each neuron and an activation function associated with each neuron of first subsampling layer 444.

At step 460, CNN 440 performs a first subsampling function. For example, CNN 440 can perform a first subsampling function based on CNN 440 providing the values output by first convolution layer 442 to corresponding neurons of first subsampling layer 444. In some embodiments, CNN 440 performs the first subsampling function based on an aggregation function. In an example, CNN 440 performs the first subsampling function based on CNN 440 determining the maximum input among the values provided to a given neuron (referred to as a max pooling function). In another example, CNN 440 performs the first subsampling function based on CNN 440 determining the average input among the values provided to a given neuron (referred to as an average pooling function). In some embodiments, CNN 440 generates an output based on CNN 440 providing the values to each neuron of first subsampling layer 444, the output sometimes referred to as a subsampled convolved output.

At step 465, CNN 440 performs a second convolution function. In some embodiments, CNN 440 performs the second convolution function in a manner similar to how CNN 440 performed the first convolution function, described above. In some embodiments, CNN 440 performs the second convolution function based on CNN 440 providing the values output by first subsampling layer 444 as input to one or more neurons (not explicitly illustrated) included in second convolution layer 446. In some embodiments, each neuron of second convolution layer 446 is associated with a filter, as described above. The filter(s) associated with second convolution layer 446 may be configured to identify more complex patterns than the filter associated with first convolution layer 442, as described above.

In some embodiments, CNN 440 performs the second convolution function based on CNN 440 multiplying the values provided as input to each of the one or more neurons included in second convolution layer 446 with the values of the filter that corresponds to each of the one or more neurons. For example, CNN 440 can multiply the values provided as input to each of the one or more neurons included in second convolution layer 446 with the values of the filter that corresponds to each of the one or more neurons to generate a single value or an array of values as an output.

In some embodiments, CNN 440 provides the outputs of each neuron of second convolutional layer 446 to neurons of a downstream layer. For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of second subsampling layer 448. In some embodiments, CNN 440 adds a bias value to the aggregates of all the values provided to each neuron of the downstream layer. For example, CNN 440 adds a bias value to the aggregates of all the values provided to each neuron of second subsampling layer 448. In such an example, CNN 440 determines a final value to provide to each neuron of second subsampling layer 448 based on the aggregates of all the values provided to each neuron and an activation function associated with each neuron of second subsampling layer 448.

At step 470, CNN 440 performs a second subsampling function. For example, CNN 440 can perform a second subsampling function based on CNN 440 providing the values output by second convolution layer 446 to corresponding neurons of second subsampling layer 448. In some embodiments, CNN 440 performs the second subsampling function based on CNN 440 using an aggregation function. In an example, CNN 440 performs the first subsampling function based on CNN 440 determining the maximum input or an average input among the values provided to a given neuron, as described above. In some embodiments, CNN 440 generates an output based on CNN 440 providing the values to each neuron of second subsampling layer 448.

At step 475, CNN 440 provides the output of each neuron of second subsampling layer 448 to fully connected layers 449. For example, CNN 440 provides the output of each neuron of second subsampling layer 448 to fully connected layers 449 to cause fully connected layers 449 to generate an output. In some embodiments, fully connected layers 449 are configured to generate an output associated with a prediction (sometimes referred to as a classification). The prediction may include an indication that an object included in the image provided as input to CNN 440 includes an object, a set of objects, and/or the like. In some embodiments, perception system 402 performs one or more operations and/or provides the data associated with the prediction to a different system, described herein.

Classifier System

Figure 5A:
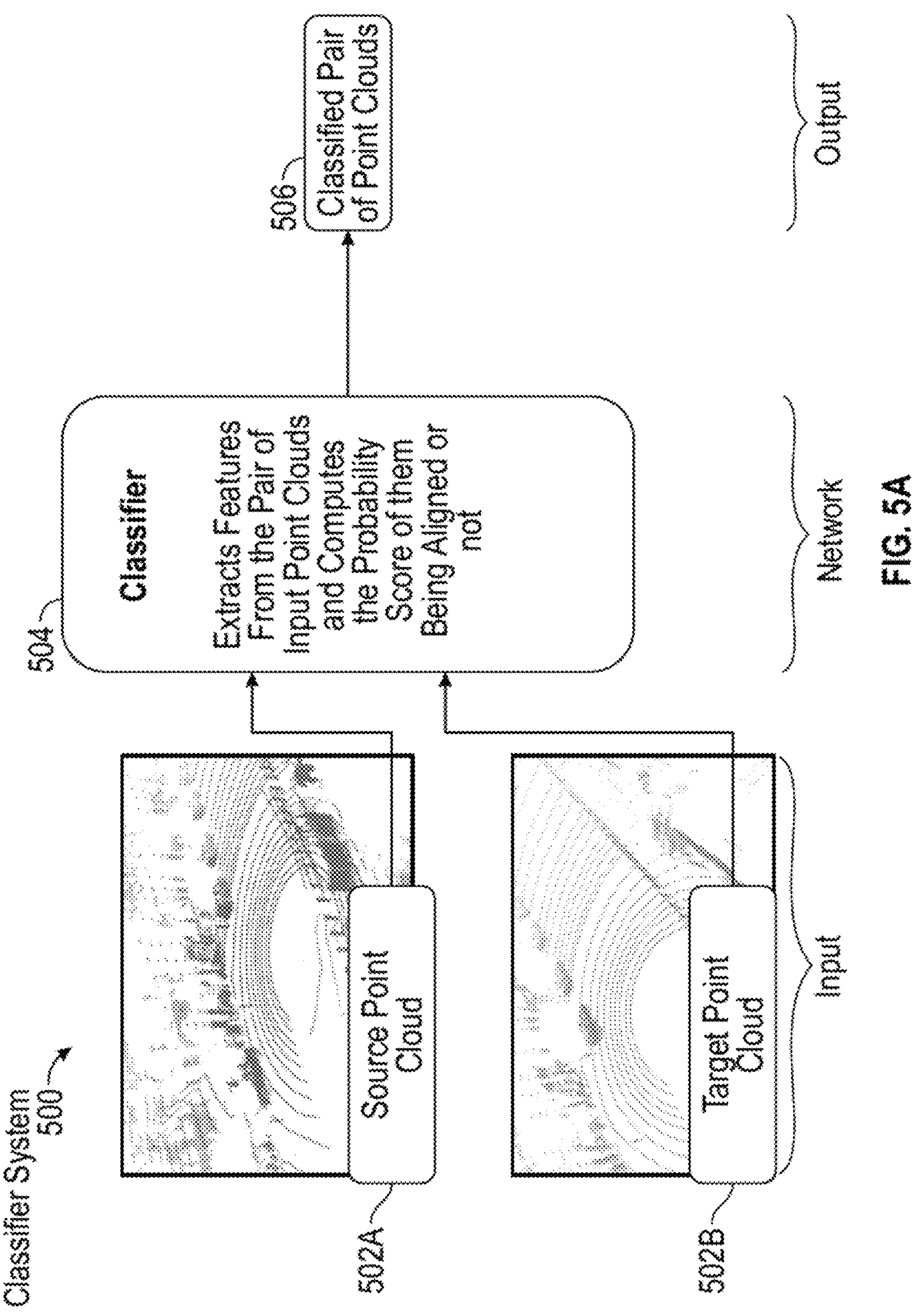
FIG. 5A is a block diagram illustrating an example of point cloud alignment classifier system.

FIG. 5A is a block diagram illustrating an example of a point cloud alignment classifier system 500 (referred to as classifier system 500) for classifying at least two point clouds as aligned or misaligned.

Figure 7A:
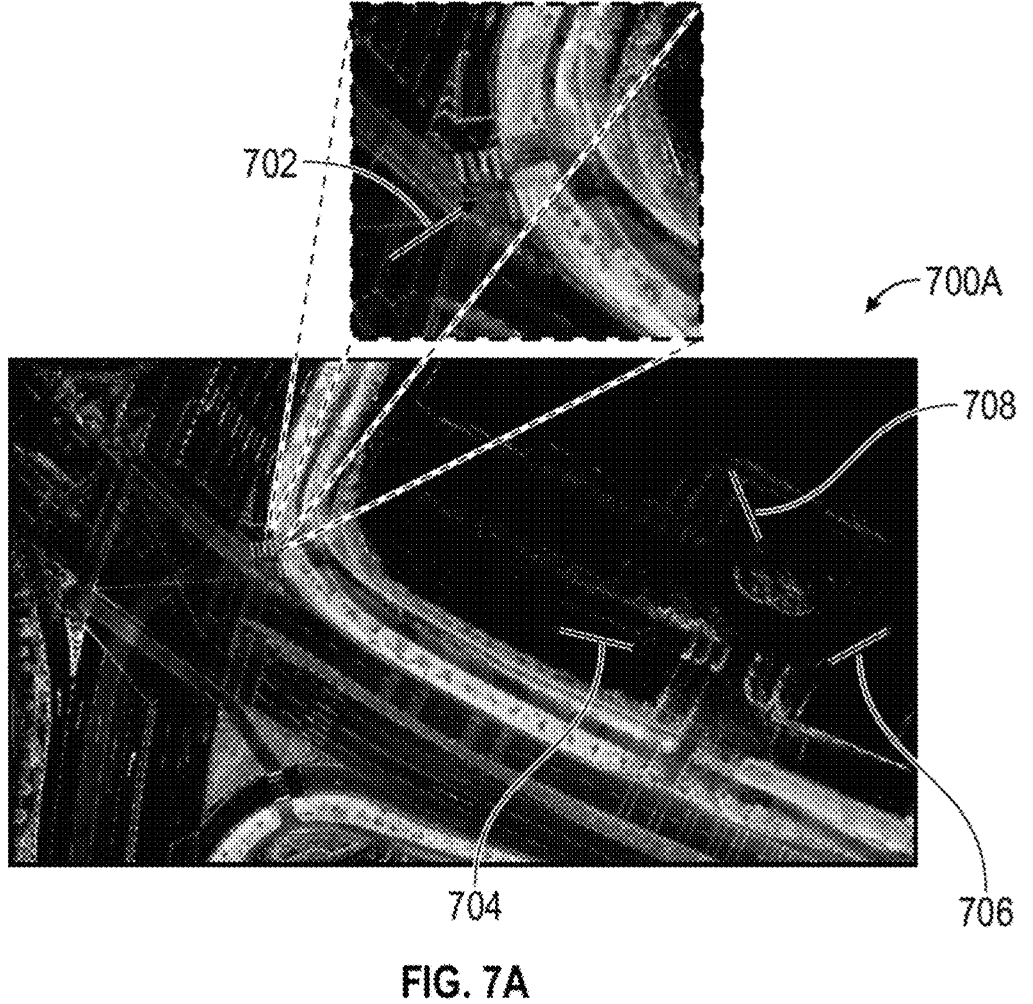
FIGS. 7A-7F are diagrams illustrating point clouds to illustrate aligned point clouds, misaligned point clouds, and/or classifications thereof.
Figure 7B:
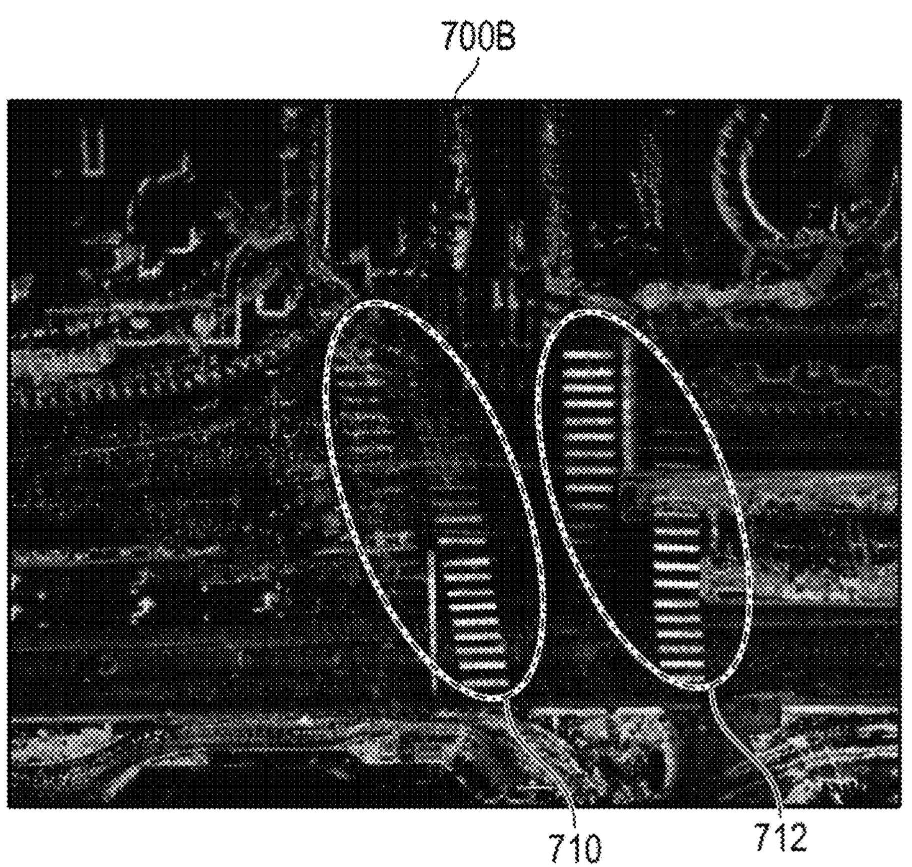
Figure 7C:
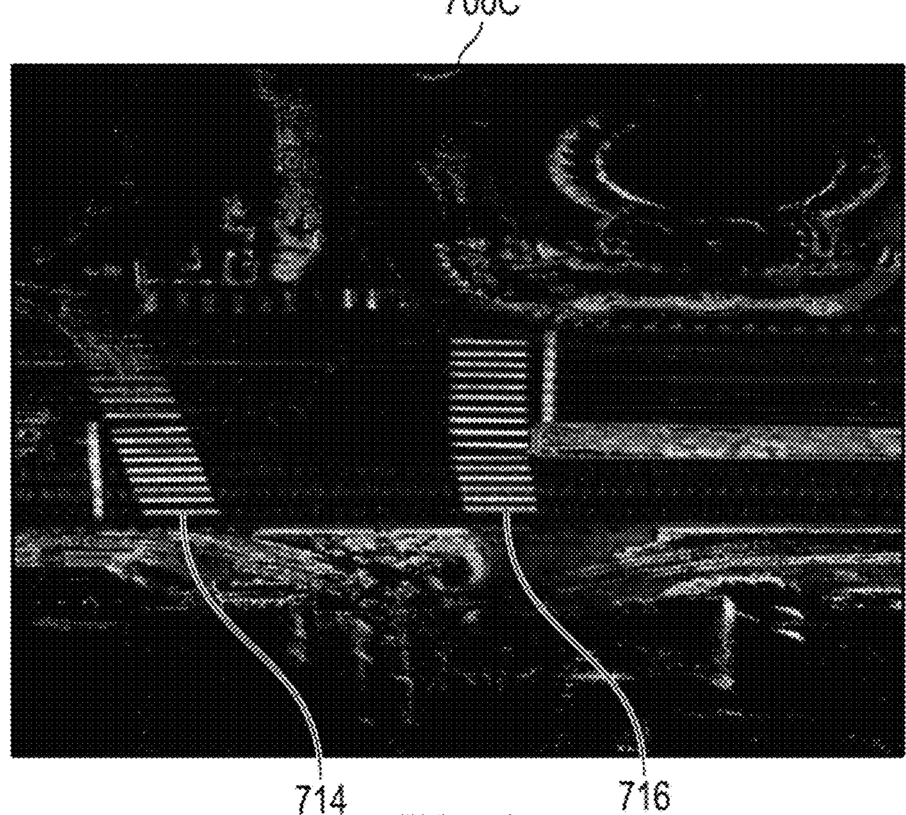

For instance, turning to FIGS. 7A-7C, FIGS. 7A-7C depict artifacts in misaligned pairs of point clouds, as compared to aligned pairs of point clouds. In particular, in FIG. 7A, artifacts 702-708 in raster image 700A are indicative of misaligned point clouds for a particular locality. The artifacts 702-708 may be generated due to convergence to non-optimal solutions (e.g., to local minima) during point cloud registration. Point cloud registration may attempt to maximally align two (or more) point clouds that are partially observing same locality. Generally, registration algorithms aim to return a rigid transformation that best aligns the input point clouds. However, due to noise affecting LiDAR data and the probabilistic nature of the problem, no registration approach is guaranteed to converge to the optimal solution. In FIG. 7B, artifacts 710 and 712 in raster image 700B are indicative of misaligned point clouds, while raster image 7000 in FIG. 7C may indicate alignment for a same locality. Classifier system 500 may aim to classify each accurately without relying on human in the loop feedback.

The classifier system 500 can be used in a point cloud registration process, a map correction process, a localization process, and/or a calibration process. The classifier system 500 can be, depending on context, hosted on the perception system 402, the localization system 406, the remote AV system 114, and the like, and generally wherever the point cloud registration process, the map correction process, the localization process, and/or the calibration process are performed. The classifier system 500 may include a classifier network 504 that processes a source point cloud 502A and a target point cloud 502B (inputs) to output a classification of the pair of point clouds 506, as aligned or misaligned (outputs).

In some embodiments, the classifier system 500 may classify point clouds as misaligned or aligned using a machine learning network. For example, the classifier system 500 may: obtain at least two LiDAR point clouds; process the at least two LiDAR point clouds using at least one classifier network; obtain at least one output dataset from the at least one classifier network; determine that the at least two LiDAR point clouds are misaligned based on the at least one output dataset; and perform a first action based on the determining that the at least two LiDAR point clouds are misaligned. Additionally or alternatively, the classifier system 500 may: obtain a second at least two LiDAR point clouds; process the second at least two LiDAR point clouds using the at least one classifier network; obtain a second at least one output dataset from the at least one classifier network; determine that the second at least two LiDAR point clouds are aligned based on the second at least one output dataset; and perform a second action based on the determining that the second at least two LiDAR point clouds are aligned. Therefore, generally, the classifier system 500 may determine whether LiDAR point clouds are aligned or misaligned and perform an action in accordance with that determination.

Inputs

The classifier system 500 may obtain, as inputs, a source point cloud 502A and a target point cloud 502B. Generally, the classifier system 500 may obtain the source point cloud 502A and a target point cloud 502B as a part of the point cloud registration process, the map correction process, the localization process, and/or the calibration process. For instance, the classifier system 500 may obtain the source point cloud 502A and a target point cloud 502B (referred to alternatively as "the at least two LiDAR point clouds") by: obtaining the at least two LiDAR point clouds from a first plurality of LiDAR point clouds for the point cloud registration process to map a locality of a map; obtaining a first LiDAR point cloud of the at least two LiDAR point clouds from a LiDAR system (e.g., LiDAR sensors 202*b*) onboard a vehicle (e.g., vehicle 200) and a second LiDAR point cloud of the at least two LiDAR point clouds from a second plurality of LiDAR point clouds for the map correction process; obtaining the first LiDAR point cloud from the LiDAR system onboard the vehicle and the second LiDAR point cloud from a third plurality of LiDAR point clouds for the localization process; or obtaining the first LiDAR point cloud from the LiDAR system onboard the vehicle and the second LiDAR point cloud from a fourth plurality of LiDAR point clouds for the calibration process.

In the case the classifier system 500 is a part of the point cloud registration process, the classifier system 500 may select a locality of a map (e.g., an unmapped locality, or a locality that requires remapping); determine any LiDAR point clouds that were obtained near (e.g., within sensing range of) the locality from the first plurality of LiDAR point clouds (e.g., based on GPS or other localization determination); and select the at least two LiDAR point clouds from the set of any LiDAR point clouds (e.g., at random, or by an algorithm to select point clouds having point clouds that have overlapping point cloud coverage). The first plurality of LiDAR point clouds may be all (or a subset thereof, e.g., in city, state, country, etc.) of LiDAR point clouds used in the point cloud registration process and/or the mapping process. One or both of the selected LiDAR point clouds may be transformed to align the respective LiDAR point clouds to account for different locations and/or orientations of the LiDAR sensor that captured the LiDAR point cloud. In this way, pairs of LiDAR point clouds may be selected to create composites of localities to assist in the mapping process of localities. However, the selected LiDAR point clouds (that may be transformed) may include artifacts, as discussed above. Therefore, each pair (or a subset thereof) of selected LiDAR point clouds may be processed via the classifier system 500 to determine whether the selected LiDAR point clouds are aligned or misaligned. In this way, misaligned pairs of LiDAR point clouds may be removed from the registration process so that the mapping process maintains a threshold level of accuracy and precision with respect to reality of a locality at a particular time.

In the case the classifier system 500 is a part of the map correction process, the classifier system 500 may determine a location of a locality (e.g., GPS or other localization determination); determine any LiDAR point clouds that were obtained near (e.g., within sensing range of) the locality from the second plurality of LiDAR point clouds (e.g., based on GPS or other localization determination of the second plurality of LiDAR point clouds); and select the second LiDAR point cloud from the set of any LiDAR point clouds (e.g., at random, or by an algorithm to select point clouds having point clouds that have overlapping point cloud coverage with the first LiDAR point cloud). The second plurality of LiDAR point clouds may be all (or a subset thereof, e.g., in city, state, country, etc.) of LiDAR point clouds used in maps of the localization process (e.g., see localization system 406 above). One or both of the first and second LiDAR point clouds may be transformed to align the respective LiDAR point clouds to account for different locations and/or orientations of the LiDAR sensor that captured the LiDAR point cloud. In this way, a currently sensed LiDAR point cloud may be used to confirm an existing LiDAR point cloud to assist in the mapping process of localities. However, the first and second LiDAR point clouds (that may be transformed) may include artifacts, as discussed above. Therefore, each pair (or a subset thereof) of first and second LiDAR point clouds may be processed via the classifier system 500 to determine whether the first and second LiDAR point clouds are aligned or misaligned. In this way, aligned pairs of LiDAR point clouds may be used to confirm an extent mapped locality (e.g., environment remains the same) and/or misaligned pairs of LiDAR point clouds may be removed from the map correction process so that the mapping process maintains a threshold level of accuracy and precision with respect to reality of a locality at a particular time.

In the case the classifier system 500 is a part of the localization process, the classifier system 500 may determine a location of a locality (e.g., GPS or other localization determination); determine any LiDAR point clouds that were obtained near (e.g., within sensing range of) the locality from the third plurality of LiDAR point clouds (e.g., based on GPS or other localization determination of the third plurality of LiDAR point clouds); and select the second LiDAR point cloud from the set of any LiDAR point clouds (e.g., at random, or by an algorithm to select point clouds having point clouds that have overlapping point cloud coverage with the first LiDAR point cloud). The third plurality of LiDAR point clouds may be all (or a subset thereof, e.g., in city, state, country, etc.) of LiDAR point clouds used in maps of the localization process (e.g., see localization system 406 above). One or both of the first and second LiDAR point clouds may be transformed to align the respective LiDAR point clouds to account for different locations and/or orientations of the LiDAR sensor that captured the LiDAR point cloud. In this way, a currently sensed LiDAR point cloud may be used to align with an existing LiDAR point cloud and, thereby, determine an accurate location of the vehicle by reversing the transformation (if any) from the previous known location to a current location. However, the first and second LiDAR point clouds (that may be transformed) may include artifacts, as discussed above. Therefore, each pair (or a subset thereof) of first and second LiDAR point clouds may be processed via the classifier system 500 to determine whether the first and second LiDAR point clouds are aligned or misaligned. In this way, aligned pairs of LiDAR point clouds may be used to determine a location of a vehicle; and/or misaligned pairs of LiDAR point clouds may be marked as possibly inconsistent (e.g., the environment may have changed) and the second LiDAR point cloud may be removed from the localization process so that the mapping process maintains a threshold level of accuracy and precision with respect to reality of a locality at a particular time.

In the case the classifier system 500 is a part of the calibration process, the classifier system 500 may determine a calibration test from at least one calibration test (e.g., determine vehicle 200 is located at a known calibration testing site using GPS or other localization determination); obtain, as the second LiDAR point cloud, a particular test calibration LiDAR corresponding to the calibration test from the fourth plurality of LiDAR point clouds (e.g., from a server or from memory). The fourth plurality of LiDAR point clouds may be all (or a subset thereof, e.g., in city, state, country, etc.) calibration test point clouds used to calibrate LiDAR sensors (e.g., LiDAR sensors 202*a*). One or both of the first and second LiDAR point clouds may be transformed to align the respective LiDAR point clouds to account for different locations and/or orientations of the LiDAR sensor that captured the LiDAR point cloud. In this way, a currently sensed LiDAR point cloud may be used to calibrate the LiDAR sensors (e.g., LiDAR sensors 202*b*) with an existing LiDAR point cloud. However, the first and second LiDAR point clouds (that may be transformed) may include artifacts, as discussed above. Therefore, each pair (or a subset thereof) of first and second LiDAR point clouds may be processed via the classifier system 500 to determine whether the first and second LiDAR point clouds are aligned or misaligned. In this way, aligned pairs of LiDAR point clouds may be used to indicate that the LiDAR sensors are calibrated sufficiently, and/or misaligned pairs of LiDAR point clouds may be used to calibrate LiDAR sensors and/or indicate further calibration is necessary.

Network

The classifier network 504 may extract features from a pair of point clouds (e.g., the source point cloud 502A and the target point cloud 502B), and compute a probability score of the pair of point clouds being aligned or misaligned. The classifier network 504 may include at least one classifier network. The at least one classifier network may include at least one of: a pillar-based network and/or a kernel point convolution-based network. In some embodiments, the classifier network is the pillar-based network. In some embodiments, the classifier network is the kernel point convolution-based network. In some embodiments, the classifier network includes both the pillar-based network and the kernel point convolution-based network. Details of the pillar-based network and the kernel point convolution-based network are discussed below with respect to FIGS. 5B and 5C.

In the case the at least one classifier network includes both the pillar-based network and the kernel point convolution-based network, the classifier system 500 may determine whether the at least two LiDAR point clouds are aligned or misaligned based on outputs of both the pillar-based network and the kernel point convolution-based network. For instance, the classifier system 500 may select a classification with a higher confidence value (if output in output dataset(s)); determine a classification if both outputs agree on a classification; and/or fuse the output dataset(s) from both the pillar-based network and the kernel point convolution-based network. For instance, to fuse the output dataset(s), the classifier system 500 may weight output dataset(s) with respective predefined weights, weight output dataset(s) in accordance with respective confidence values, and the like. Therefore, to determine that the at least two LiDAR point clouds are aligned or misaligned, the classifier system 500 may use outputs of each network.

Output(s)

Generally, the pillar-based network and/or the kernel point convolution-based network of the classifier network 504 may generate output datasets. The output datasets may include a binary classification (aligned or misaligned), a probability score, and/or a confidence score, and the like. If a probability score is output, the classifier system 500 may determine a binary determination of aligned or misaligned based on a probability threshold condition. The probability threshold condition may be evaluate to aligned if the probability score is greater than a probability threshold, greater than or equal to the probability threshold, less than the probability threshold, or less than or equal to the probability threshold; the probability threshold condition may be evaluate to misaligned if the probability score is greater than the probability threshold, greater than or equal to the probability threshold, less than the probability threshold, or less than or equal to the probability threshold.

As discussed above, the classifier system 500 may be used in the point cloud registration process, the map correction process, the localization process, and/or the calibration process. The classifier system may take different actions (depending on which process it is used in), as discussed above. In particular, in the case of the point cloud registration process, the classifier system 500 may take a first action if the LiDAR point clouds are misaligned and take a second action if the LiDAR point clouds are aligned.

In some embodiments, the first action may include: labeling the at least two LiDAR point clouds as misaligned, and/or updating a locality of a map based on labeling the at least two LiDAR point clouds as misaligned. To label the at least two LiDAR point clouds as misaligned, the classifier system 500 may update the first plurality of LiDAR point clouds to indicate these two particular LiDAR point clouds are misaligned. To update a locality of a map, the classifier system 500 may indicate the locality of the map has misaligned LiDAR point clouds and/or not sufficient LiDAR point cloud data to be reliably used for, e.g., mapping and/or localization process.

In some embodiments, the second action may include: labeling the at least two LiDAR point clouds as aligned, and/or updating a locality of a map based on labeling the second at least two LiDAR point clouds as aligned. To label the at least two LiDAR point clouds as aligned, the classifier system 500 may update the first plurality of LiDAR point clouds to indicate these two particular LiDAR point clouds are aligned. To update a locality of a map, the classifier system 500 may indicate the locality of the map has aligned LiDAR point clouds and/or sufficient LiDAR point cloud data to be reliably used for, e.g., mapping and/or localization process.

Example Networks of Classifier System

Figure 5B:
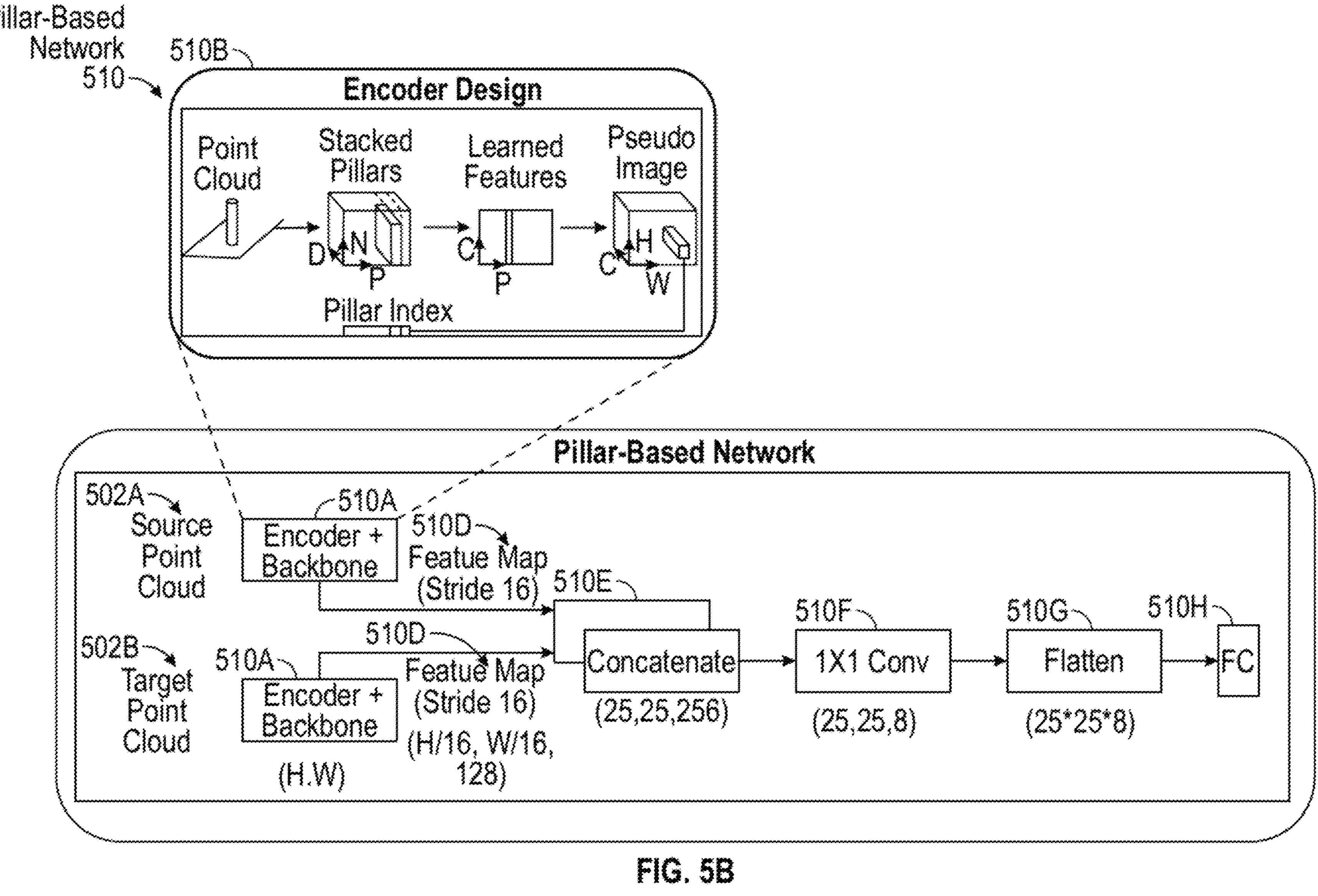
FIGS. 5B and 5C are block diagrams illustrating example networks of the point cloud alignment classifier system.
Figure 5C:
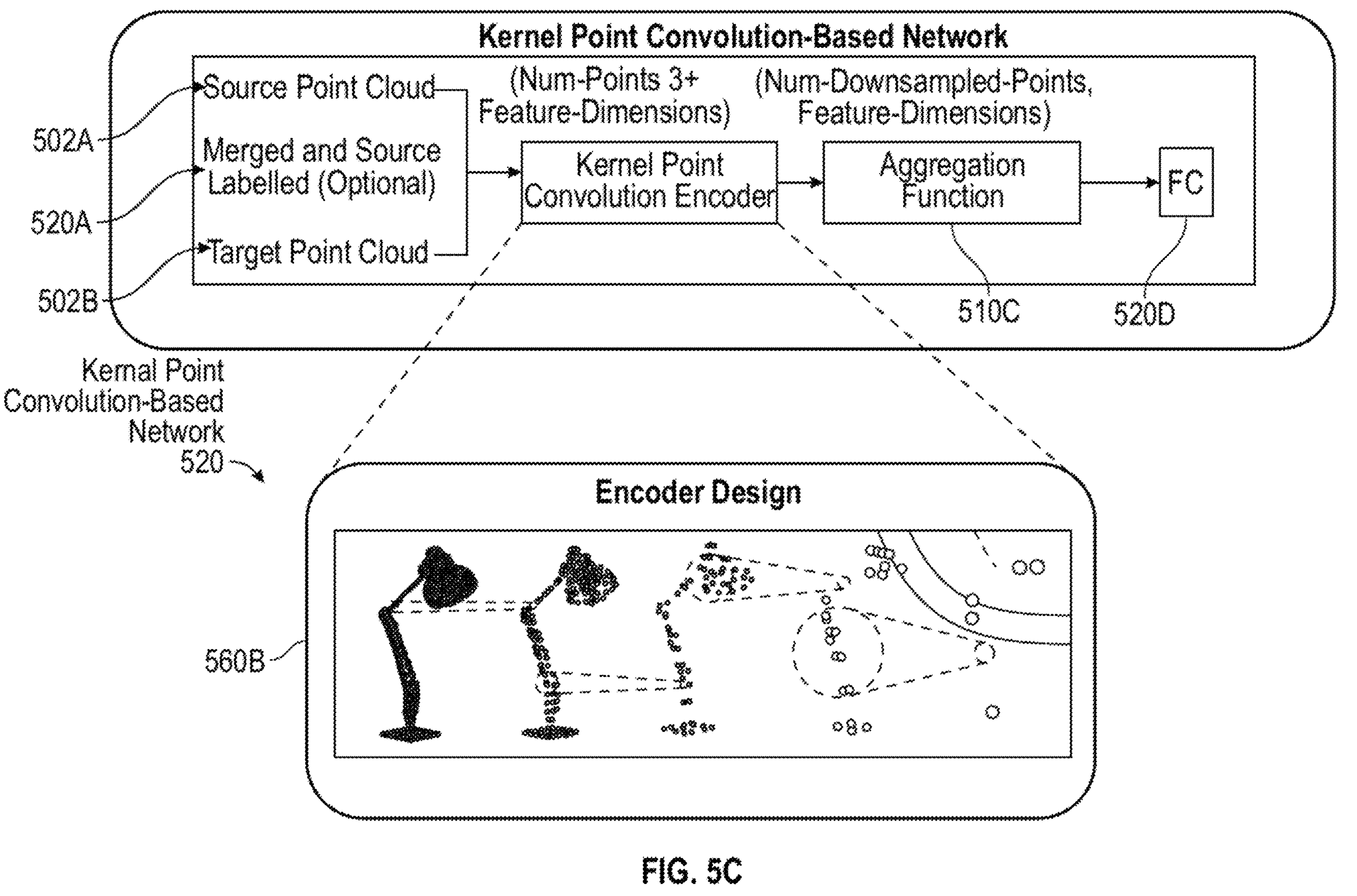

FIGS. 5B and 5C are block diagrams illustrating example networks of the point cloud alignment classifier system 500.

With reference to FIG. 5B, a pillar-based network 510 may process a source point cloud 502A and a target point cloud 502B to output a classification of aligned or misaligned, as discussed above. The pillar-based network 510 may include: a feature network 510A, at least one functional network 510E, 510F, 510G, and a fully connected layer 510H.

The feature network 510A may receive at least one LiDAR point cloud (e.g., source point cloud 502A, a target point cloud 502B, or both) and output at least one feature map 510D. The pillar-based network 510 may include two or more feature networks 510A that correspond to each of the at least two LiDAR point clouds to be input (referred to as processing point clouds independently). Generally, a number of feature networks 510A may correspond to an expected number of LiDAR point clouds to be input. In the case depicted in FIG. 5B, two feature networks 510A are used to generate two feature maps 510D corresponding to each of the input LiDAR point clouds. Moreover, only one feature network 510A may be used to process the at least two LiDAR point clouds (referred to as processing as a merged point cloud, discussed below with respect to FIG. 5C). As depicted in FIG. 5B, the pillar-based network 510 may include at least a first feature network 510A that receives a first LiDAR point cloud 502A and outputs a first feature map 510D, and a second feature network 510A that receives a second LiDAR point cloud 502B and outputs a second feature map 510D.

Each feature network 510A may include: a pillar encoder 510B and a feature backbone 510C. The pillar encoder 510B may receive the at least one LiDAR point cloud and output at least one pseudo-image, as described in "PointPillars: Fast Encoders for Object Detection from Point Clouds," in "Proceedings of the IEEE/CVF Conference on Computer Vision and Pattern Recognition (CVPR)," arXiv:1812.05784v2 [cs.LG] 5 May 2019, incorporated herein by reference for all purposes.

The feature backbone 510C may receive the at least one pseudo-image and output the at least one feature map 510D. The feature backbone 510C may be a feature extraction network. For example the features backbone 510C may be a convolution neural network and the like, including any of ResNet, VGG, and the like.

The at least one functional network 510E, 510F, 510G may receive the at least one feature map 510D and output a feature vector. For example, the at least one functional network 510E, 510F, 510G may receive one feature map in the case that the at least two LiDAR point clouds are merged, or the at least one functional network 510E, 510F, 510G may receive at least two feature maps (as depicted in FIG. 5B) in the case that at least two LiDAR point clouds are processed independently, and the like. The at least one functional network may include at least one of: a concatenation network 510E, at least one convolutional network 510F, and/or a flatten network 510G. The at least one functional network may not include the concatenation network 510E in the case that the at least two LiDAR point clouds are processed as a merged point cloud.

The fully connected layer 510H may receive the feature vector and output a classification dataset. The classification dataset may be the at least one output dataset for the pillar-based network 510 and, therefore, includes a binary classification (aligned or misaligned), a probability score, and/or a confidence score, and the like, as discussed above.

With reference to FIG. 5C, a kernel point convolution-based network 520 may process a source point cloud 502A and a target point cloud 502B to output a classification of aligned or misaligned, as discussed above. The kernel point convolution-based network 520 may include a kernel point convolution-based encoder 520B, an aggregation function 520C, and a fully connected layer 520D.

The kernel point convolution-based encoder 520B may receive the at least two LiDAR point clouds and outputs a plurality of feature vectors. For instance, the kernel point convolution-based encoder 520B may determine the plurality of feature vectors based an input point cloud, as described in "KPConv: Flexible and Deformable Convolution for Point Clouds," in "Proceedings of the IEEE International Conference on Computer Vision 2019," arXiv:1904.08889v2 [cs.CV] 19 Aug. 2019, incorporated herein by reference for all purposes. The kernel point convolution-based encoder 520B may receive as input a merged point cloud 520A. The merged point cloud 520A may include each of the points [coordinates x, y, z and reflectance r] of each of the at least two LiDAR point clouds before being input to the kernel point convolution-based encoder 520B. The merged point cloud 520A may be source-labeled to each of the at least two LiDAR point clouds. For instance, each point may be labeled with a binary label indicating a source of the point.

Generally, a number of the plurality of features vectors is not known beforehand. For instance, the kernel point convolution-based encoder 520B may perform a sequence of down sampling convolution operations to obtain descriptive feature(s). Therefore, the aggregation function 520C may receive the plurality of feature vectors and aggregate the plurality of feature vectors into a single feature vector. For instance, the aggregation function 520C may be one of the following: a max pooling function a random choice function, a global average function, a mean value function, or a non-parametric aggregation function.

The fully connected layer 520D may receive the single feature vector and output a classification dataset. The classification dataset may be the at least one output dataset for the kernel point convolution-based network 520 and, therefore, includes a binary classification (aligned or misaligned), a probability score, and/or a confidence score, and the like, as discussed above.

Qualitative Results

Generally, the classifier network 504 disclosed herein is able to achieve high levels of accuracy to detect misalignments. In particular, Table 1 indicates misalignment detection accuracy for particular types of the classifier network 504.

TABLE 1

| Network Type | Misalignment Detection Accuracy |
|---|---|
| Pillar-based network 510 | 96.81% |
| Kernel point convolution-based network 520 | 99.78% |

For the pillar-based network 510, the misalignment detection accuracy is reported using a network version where the pairs of point clouds are processed independently. For the kernel point convolution-based network 520, the misalignment detection accuracy is reported using a network version where the pairs of point clouds are merged and then processed as a merged point cloud. The misalignment detection accuracies are reported as the maximum validation F1 score across different stages of the training process.

Qualitative Results

Figures 7D, 7E:
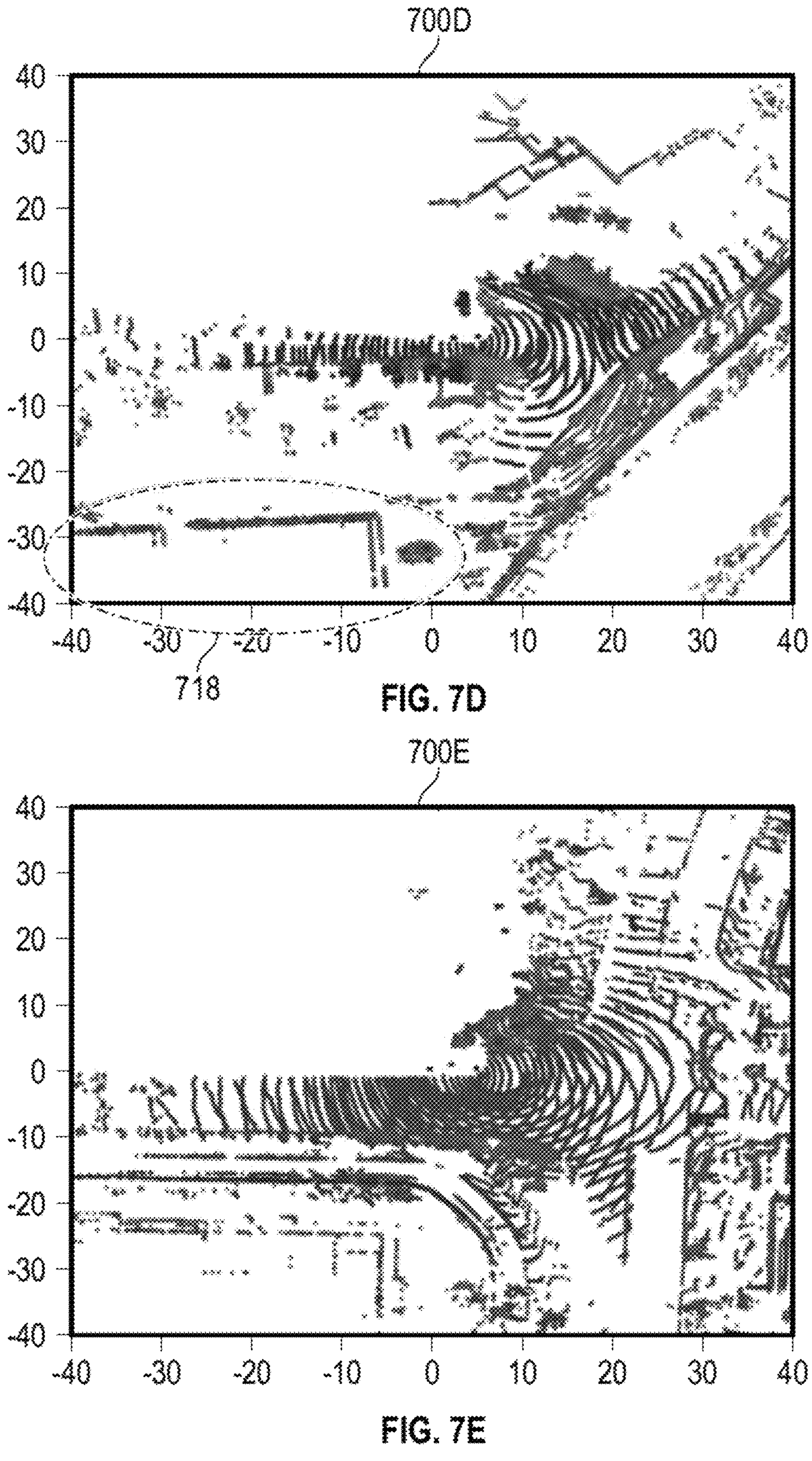
Figure 7F:
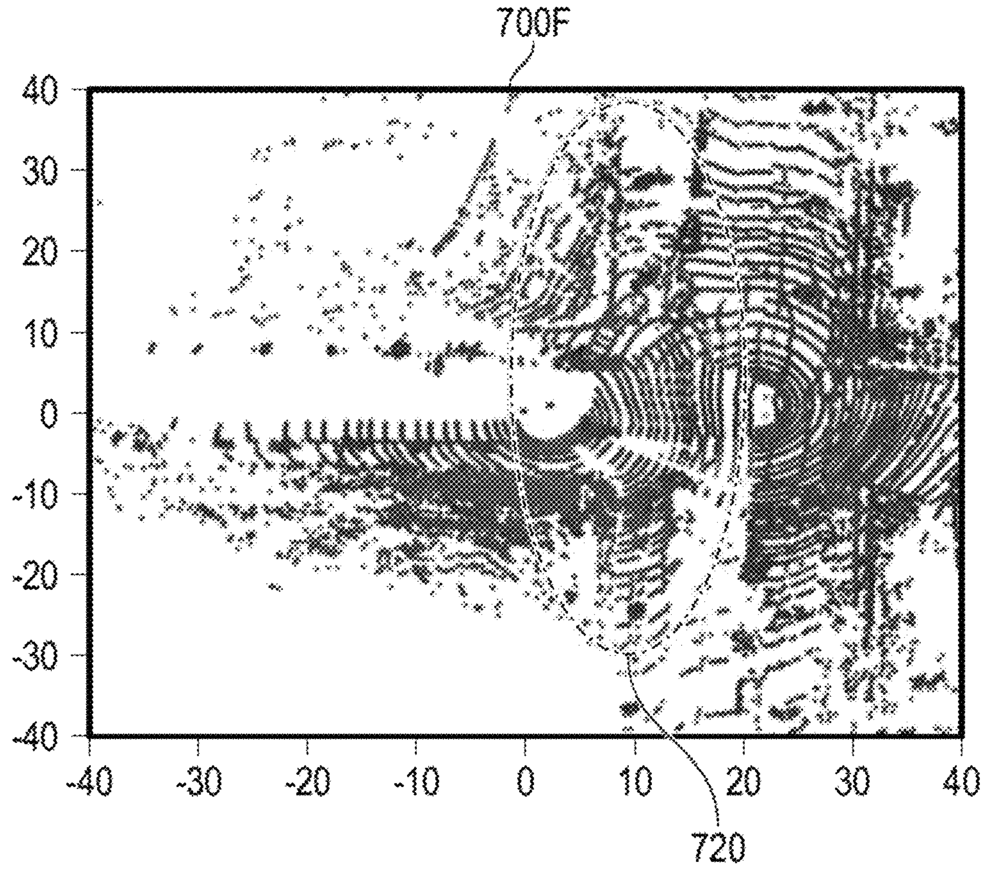

Turning to FIGS. 7D-7F, the classifier network 504 is capable of correctly classifying pairs of LiDAR point clouds. For instance, the classifier network 504 is capable of classifying pairs of LiDAR point clouds with a wide range of artifacts (e.g., misalignments).

For instance, in FIG. 7D, the classifier network 504 is capable of correctly classifying a pair of LiDAR point clouds 700D as misaligned with large-magnitude artifacts, such as artifact 718. In FIG. 7E, the classifier network 504 is capable of correctly classifying a pair of LiDAR point clouds 700E as aligned. In FIG. 7F, the classifier network 504 is capable of correctly classifying a pair of LiDAR point clouds 700F as misaligned with low-magnitude artifacts, such as artifact 720. Generally, classifying a pair of LiDAR point clouds with low-magnitude artifacts is more difficult for a human operator.

Training of Classifier Network

Generally, the classifier network 504 may be trained using various techniques, including supervised learning, unsupervised learning, semi-supervised learning, and the like. For instance, the classifier network 504 may be trained on training data including labeled sets of misaligned and aligned pairs of LiDAR point clouds with appropriate loss functions providing feedback to adjust the classifier network 504. The training data may be previously identified sets of misaligned and aligned pairs of LiDAR point clouds, as identified by humans in the loop. Alternatively or additionally, the training data may include additional labeled sets of misaligned and aligned pairs as humans provide feedback with respect to classification output by the classifier network 504 on unlabeled/new pairs of LiDAR point clouds.

In some cases, the training data may include misaligned pairs of LiDAR point clouds generated from aligned pairs of LiDAR point clouds. The aligned pairs of LiDAR point clouds may be obtained from real-world data collection and labeled by humans in the loop. In some cases, the training data may have an equal number of aligned and misaligned pairs. In some cases, the training data may have an unequal number of aligned and misaligned pairs. For instance, the training data may include thousands to tens of thousands paired LiDAR point clouds. Moreover, the training data may be split into different sets of paired LiDAR point clouds for validation, training, and testing. In each of the sets of paired LiDAR point clouds, one portion may be assigned to an aligned dataset and another portion may be assigned to a misaligned dataset.

To generate misaligned pairs of LiDAR point clouds from aligned pairs of LiDAR point clouds, a computer system (e.g., the classifier system 500) may generate misalignment transformations and apply the misalignment transformations to LiDAR point clouds of the misaligned dataset. For instance, for each pair of LiDAR point clouds, a misalignment transformation may be applied to one LiDAR point cloud of the pair of LiDAR point clouds. A misalignment transformation may be a rigid-body transformation. To generate the misalignment transformations, the computer system may build the misalignment transformations from a zero-centered normal distribution ($\mu=0$, $\sigma^2$) for translation and rotation components, with $\sigma_i, \in [t_x, t_y, t_z, r_x, r_y, r_z]$, where $t_x$, $t_y$, $t_z$ are translations and $r_x$, $r_y$, $r_z$ are rotations. In some cases, magnitudes of each $\sigma_i, \in [t_x, t_y, t_z, r_x, r_y, r_z]$ may be predetermined in accordance with observed misalignments. For instance, the zero-centered normal distribution may adhere to equation (1).

$$t_x \sim \aleph(0, \sigma_{t_x}^2),\ t_y \sim \aleph(0, \sigma_{t_y}^2),\ t_z \sim \aleph(0, \sigma_{t_z}^2)$$

$$r_x \sim \aleph(0, \sigma_r^2),\ r_r \sim \aleph(0, \sigma_{r_y}^2),\ r_z \sim \aleph(0, \sigma_{r_z}^2)$$

For instance, the computer system may sample components from the normal distribution in accordance with an arbitrary probability of p. Probability p may be set to, e.g., 0.5, but those of skill in the art would recognize that probability p may be set to a different probability.

In some cases, the misalignment transformations may be re-sampled for each training epoch. Thus, effectively generating stochastic variants of the training data repeatedly during training, thus increasing diversity of the training data.

In some cases, such as for the validation training set, users may generate misalignment transformations for the training data that recreate commonly encountered misaligned mapping artifacts. In some cases, the magnitudes of each $\sigma_i$, $\in[t_x, t_y, t_z, r_x, r_y, r_z]$ may be set in accordance the user-generated misaligned transformations.

Example Flow Diagram of Classifier System

Figure 6:
FIG. 6 is a flow diagram illustrating an example of a routine implemented by one or more processors to train the perception system.
Figure 6:
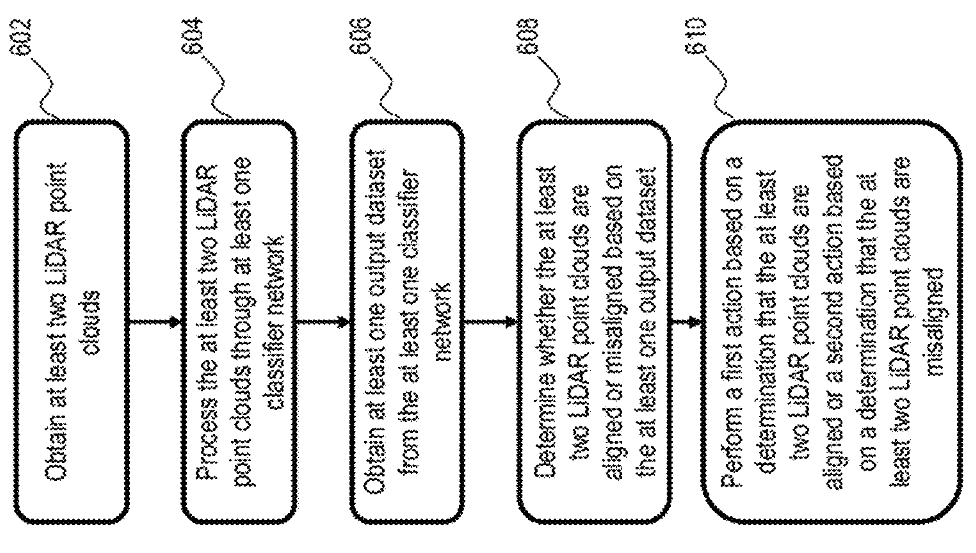

FIG. 6 is a flow diagram illustrating an example of a routine 600 implemented by one or more processors to classify point clouds in a perception system 402. The flow diagram illustrated in FIG. 6 is provided for illustrative purposes only. It will be understood that one or more of the steps of the routine 600 illustrated in FIG. 6 may be removed or that the ordering of the steps may be changed. Furthermore, for the purposes of illustrating a clear example, one or more particular system components are described in the context of performing various operations during each of the data flow stages. However, other system arrangements and distributions of the processing steps across system components may be used.

At block 602, the classifier system 500 may obtain at least two LiDAR point clouds. For instance, the classifier system 500 may obtain a source point cloud 502A and a target point cloud 502B, as discussed above.

At block 604, the classifier system 500 may process the at least two LiDAR point clouds through at least one classifier network. For instance, the classifier system 500 may process the source point cloud 502A and the target point cloud 502B through one or both of the pillar-based network 510 or kernel point convolution-based encoder 520B, as discussed above.

At block 606, the classifier system 500 may obtain at least one output dataset from the at least one classifier network. For instance, the classifier system 500 may obtain the classification dataset from one or both of the pillar-based network 510 or kernel point convolution-based encoder 520B, as discussed above.

At block 608, the classifier system 500 may determine whether the at least two LiDAR point clouds are aligned or misaligned based on the at least one output dataset. For instance, the classifier system 500 may extract binary classification(s) (aligned or misaligned) or a probability score, and/or a confidence score, from classification dataset from one or both of the pillar-based network 510 or kernel point convolution-based network 520, and determine whether the at least two LiDAR point clouds are aligned or misaligned in accordance with the binary classification(s) or the probability threshold condition with respect to the probability score(s), as discussed above.

At block 610, the classifier system 500 may perform a first action based on a determination that the at least two LiDAR point clouds are aligned or a second action based on a determination that the at least two LiDAR point clouds are misaligned. For instance, the classifier system 500 may perform the first action or the second action, as discussed above.

EXAMPLES

Clause 1. A method, comprising: obtaining at least two light detection and ranging (LiDAR) point clouds; processing the at least two LiDAR point clouds using at least one classifier network; obtaining at least one output dataset from the at least one classifier network; determining that the at least two LiDAR point clouds are misaligned based on the at least one output dataset; and performing a first action based on the determining that the at least two LiDAR point clouds are misaligned.

Clause 2. The method of Clause 1, wherein obtaining the at least two LiDAR point clouds comprises: obtaining the at least two LiDAR point clouds from a first plurality of LiDAR point clouds for a point cloud registration process to map a locality of the map; obtaining a first LiDAR point cloud of the at least two LiDAR point clouds from a LiDAR system onboard a vehicle and a second LiDAR point cloud of the at least two LiDAR point clouds from a second plurality of LiDAR point clouds for a map correction process; obtaining the first LiDAR point cloud from the LiDAR system onboard the vehicle and the second LiDAR point cloud from a third plurality of LiDAR point clouds for a localization process; or obtaining the first LiDAR point cloud from the LiDAR system onboard the vehicle and the second LiDAR point cloud from a fourth plurality of LiDAR point clouds for a calibration process.

Clause 3. The method of any of Clauses 1-2, wherein the at least one classifier network comprises at least one of: a pillar-based network or a kernel point convolution-based network.

Clause 4. The method of any of Clauses 1-3, wherein the at least one classifier network comprise a pillar-based network and a kernel point convolution-based network, and wherein determining that the at least two LiDAR point clouds are misaligned comprises: fusing the at least one output dataset from the pillar-based network and the kernel point convolution-based network, and determining that the at least two LiDAR point clouds misaligned based on the fused at least one output datasets.

Clause 5. The method of any of Clauses 1-4, wherein a first classifier network of the at least one classifier network is a pillar-based network, wherein the pillar-based network comprises: a feature network that receives at least one LiDAR point cloud and outputs at least one feature map, at least one functional network that receives the at least one feature map and outputs a feature vector, and a fully connected layer that receives the feature vector and outputs a classification dataset, wherein the at least one output dataset comprises the classification dataset.

Clause 6. The method of Clause 5, wherein the feature network includes: a pillar encoder that receives the at least one LiDAR point cloud and outputs at least one pseudo-image, and a feature backbone that receives the at least one pseudo-image and outputs the at least one feature map.

Clause 7. The method of Clause 5, wherein the at least one functional network comprise at least one of: a concatenation network, at least one convolutional network, or a flatten network.

Clause 8. The method of any of Clauses 1-4, wherein a first classifier network of the at least one classifier network is a pillar-based network, wherein the pillar-based network comprises: a first feature network that receives a first LiDAR point cloud and outputs a first feature map, a second feature network that receives a second LiDAR point cloud and outputs a second feature map, at least one functional network that receives the first feature map and the second feature map, and outputs a feature vector, and a fully connected layer that receives the feature vector and outputs a classification dataset, wherein the at least one output dataset comprises the classification dataset.

Clause 9. The method of any of Clauses 1-4, wherein a first classifier network of the at least one classifier network is a kernel point convolution-based network, wherein the kernel point convolution-based network comprises: a kernel point convolution-based encoder that receives the at least two LiDAR point clouds and outputs a plurality of feature vectors, an aggregation function that receives the plurality of feature vectors and aggregates the plurality of feature vectors into a single feature vector, and a fully connected layer that receives the single feature vector and outputs a classification dataset, wherein the at least one output dataset comprises the classification dataset.

Clause 10. The method of Clause 9, wherein the at least two LiDAR point clouds are merged to form a merged point cloud before being input to the kernel point convolution-based encoder.

Clause 11. The method of Clause 10, wherein the merged point cloud is source-labeled to each of the at least two LiDAR point clouds.

Clause 12. The method of Clause 9, wherein the aggregation function comprises a max pooling function a random choice function, a global average function, a mean value function, or a non-parametric aggregation function.

Clause 13. The method of any of Clauses 1-12, further comprising: obtaining a second at least two LiDAR point clouds; processing the second at least two LiDAR point clouds using the at least one classifier network; obtaining a second at least one output dataset from the at least one classifier network; determining that the second at least two LiDAR point clouds are aligned based on the second at least one output dataset; and performing a second action based on the determining that the second at least two LiDAR point clouds are aligned, wherein performing the second action comprises: labeling the second at least two LiDAR point clouds as aligned, and/or updating a locality of a map based on labeling the second at least two LiDAR point clouds as aligned.

Clause 14. The method of any of Clauses 1-13, wherein the first action comprises: labeling the at least two LiDAR point clouds as misaligned, and/or updating a locality of a map based on labeling the at least two LiDAR point clouds as misaligned.

Clause 15. A system, comprising: at least one processor, and at least one non-transitory storage media storing instructions that, when executed by the at least one processor, cause the at least one processor to: obtaining at least two light detection and ranging (LiDAR) point clouds; processing the at least two LiDAR point clouds using at least one classifier network; obtaining at least one output dataset from the at least one classifier network; determining that the at least two LiDAR point clouds are misaligned based on the at least one output dataset; and performing a first action based on the determining that the at least two LiDAR point clouds are misaligned.

Clause 16. The system of Clause 15, wherein the at least one classifier network comprises at least one of: a pillar-based network or a kernel point convolution-based network.

Clause 17. The system of any of Clauses 15-16, wherein the at least one classifier network comprise a pillar-based network and a kernel point convolution-based network, and wherein determining that the at least two LiDAR point clouds are misaligned comprises: fusing the at least one output dataset from the pillar-based network and the kernel point convolution-based network, and determining that the at least two LiDAR point clouds misaligned based on the fused at least one output datasets.

Clause 18. The system of any of Clauses 15-17, wherein a first classifier network of the at least one classifier network is a pillar-based network, wherein the pillar-based network comprises: a feature network that receives at least one LiDAR point cloud and outputs at least one feature map, at least one functional network that receives the at least one feature map and outputs a feature vector, and a fully connected layer that receives the feature vector and outputs a classification dataset, wherein the at least one output dataset comprises the classification dataset.

Clause 19. The system of any of Clauses 15-17, wherein a first classifier network of the at least one classifier network is a kernel point convolution-based network, wherein the kernel point convolution-based network comprises: a kernel point convolution-based encoder that receives the at least two LiDAR point clouds and outputs a plurality of feature vectors, an aggregation function that receives the plurality of feature vectors and aggregates the plurality of feature vectors into a single feature vector, and a fully connected layer that receives the single feature vector and outputs a classification dataset, wherein the at least one output dataset comprises the classification dataset.

Clause 20. At least one non-transitory storage media storing instructions that, when executed by at least one processor, cause the at least one processor to: obtaining at least two light detection and ranging (LiDAR) point clouds; processing the at least two LiDAR point clouds using at least one classifier network; obtaining at least one output dataset from the at least one classifier network; determining that the at least two LiDAR point clouds are misaligned based on the at least one output dataset; and performing a first action based on the determining that the at least two LiDAR point clouds are misaligned.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously recited step or entity.

What is claimed is:

1. A method, comprising:

generating a plurality of merged point cloud images based on a plurality of sets of LiDAR point clouds, wherein generating a first merged point cloud image of the plurality of merged point cloud images comprises merging at least two LiDAR point clouds of a first set of LiDAR point clouds of the plurality of sets of LiDAR point clouds, wherein the first merged point cloud image includes respective LiDAR points of the at least two LiDAR point clouds of the first set of LiDAR point clouds;

indicating that the at least two LiDAR point clouds of the first set of LiDAR point clouds are aligned based on the generating the first merged point cloud image;

indicating that at least two LiDAR point clouds of a second set of LiDAR point clouds of the plurality of sets of LiDAR point clouds are aligned based on generating a second merged point cloud image;

processing the plurality of merged point cloud images using at least one neural network, wherein the at least one neural network was trained by:

obtaining training data comprising at least one first set of merged point cloud images comprising misaligned pairs of LiDAR point clouds and at least one second set of merged point cloud images comprising aligned pairs of LiDAR point clouds, and training, using the training data, the at least one neural network to classify merged point cloud images as having aligned or misaligned LiDAR point clouds;

receiving, from the at least one neural network, a first probability corresponding to a likelihood that the at least two LiDAR point clouds of the first set of LiDAR point clouds included in the first merged point cloud image are misaligned;

receiving, from the at least one neural network, a second probability corresponding to a likelihood that the at least two LiDAR point clouds of the second set of LiDAR point clouds included in the second merged point cloud image are aligned;

determining that the at least two LiDAR point clouds of the first set of LiDAR point clouds are misaligned based on the first probability;

determining that the at least two LiDAR point clouds of the second set of LiDAR point clouds are aligned based on the second probability; and generating a map using the second merged point cloud image based on determining that the at least two LiDAR point clouds of the second set of LiDAR point clouds are aligned.

2. The method of claim 1, wherein obtaining at least one set of LiDAR point clouds of the plurality of sets of LiDAR point clouds comprises:

obtaining the at least one set of LiDAR point clouds from a first plurality of LiDAR point clouds for a point cloud registration process to map a locality of a map;

obtaining a first LiDAR point cloud of the at least one set of LiDAR point clouds from a LiDAR system onboard a vehicle and a second LiDAR point cloud of the at least one set of LiDAR point clouds from a second plurality of LiDAR point clouds for a map correction process;

obtaining a first LiDAR point cloud of the at least one set of LiDAR point clouds from a LiDAR system onboard a vehicle and a second LiDAR point cloud of the at least one set of LiDAR point clouds from a third plurality of LiDAR point clouds for a localization process; or obtaining a first LiDAR point cloud of the at least one set of LiDAR point clouds from a LiDAR system onboard the vehicle and a second LiDAR point cloud of the at least one set of LiDAR point clouds from a fourth plurality of LiDAR point clouds for a calibration process.

3. The method of claim 1, wherein the at least one neural network comprises at least one of: a pillar-based network or a kernel point convolution-based network.

4. The method of claim 1, wherein the at least one neural network comprises a pillar-based network and a kernel point convolution-based network, wherein receiving the first probability from the at least one neural network comprises receiving a third probability from the pillar-based network and a fourth probability from the kernel point convolution-based network, and wherein determining that the at least two LiDAR point clouds of the first set of LiDAR point clouds are misaligned comprises:

weighting the third probability from the pillar-based network and the fourth probability from the kernel point convolution-based network based on a confidence value associated with the third probability and a confidence value associated with the fourth probability, fusing the third probability from the pillar-based network and the fourth probability from the kernel point convolution-based network based on the weighting the third probability and the fourth probability, and determining that the at least two LiDAR point clouds of the first set of LiDAR point clouds are misaligned based on the fusing the third probability and the fourth probability.

5. The method of claim 1, wherein a first neural network of the at least one neural network is a pillar-based network, wherein the pillar-based network comprises:

a feature network that receives at least one LiDAR point cloud and outputs at least one feature map, at least one functional network that receives the at least one feature map and outputs a feature vector, and a fully connected layer that receives the feature vector and outputs the first probability or the second probability.

6. The method of claim 5, wherein the feature network includes:

a pillar encoder that receives the at least one LiDAR point cloud and outputs at least one pseudo-image, and a feature backbone that receives the at least one pseudo-image and outputs the at least one feature map.

7. The method of claim 5, wherein the at least one functional network comprises at least one of:

a concatenation network, at least one convolutional network, or a flatten network.

8. The method of claim 1, wherein a first neural network of the at least one neural network is a pillar-based network, wherein the pillar-based network comprises:

a first feature network that receives a first LiDAR point cloud and outputs a first feature map, a second feature network that receives a second LiDAR point cloud and outputs a second feature map, at least one functional network that receives the first feature map and the second feature map, and outputs a feature vector, and a fully connected layer that receives the feature vector and outputs the first probability or the second probability.

9. The method of claim 1, wherein a first neural network of the at least one neural network is a kernel point convolution-based network, wherein the kernel point convolution-based network comprises:

a kernel point convolution-based encoder that receives at least one merged point cloud image and outputs a plurality of feature vectors, an aggregation function that receives the plurality of feature vectors and aggregates the plurality of feature vectors into a single feature vector, and a fully connected layer that receives the single feature vector and outputs the first probability or the second probability.

10. The method of claim 1, wherein at least one merged point cloud image of the plurality of merged point cloud images is source-labeled to each of at least two LiDAR point clouds.

11. The method of claim 9, wherein the aggregation function comprises a max pooling function a random choice function, a global average function, a mean value function, or a non-parametric aggregation function.

12. The method of claim 1, further comprising:

performing a first action based on the determining that the at least two LiDAR point clouds of the second set of LiDAR point clouds are aligned, wherein performing the first action comprises:

labeling the at least two LiDAR point clouds of the second set of LiDAR point clouds as aligned, and/or updating a locality of a map based on a previous labeling of the at least two LiDAR point clouds of the second set of LiDAR point clouds as aligned.

13. The method of claim 1, further comprising:

performing a first action based on the determining that the at least two LiDAR point clouds of the first set of LiDAR point clouds are misaligned, wherein the first action comprises:

labeling the at least two LiDAR point clouds of the first set of LiDAR point clouds as misaligned, and/or updating a locality of a map based on a previous labeling of the at least two LiDAR point clouds of the first set of LiDAR point clouds as misaligned.

14. A system, comprising:

at least one processor, and at least one non-transitory storage media storing instructions that, when executed by the at least one processor, cause the at least one processor to:

generate a plurality of merged point cloud images based on a plurality of sets of LiDAR point clouds, wherein to generate a first merged point cloud image of the plurality of merged point cloud images, the instructions, when executed by the at least one processor, cause the at least one processor to merge at least two LiDAR point clouds of a first set of LiDAR point clouds of the plurality of sets of LiDAR point clouds, wherein the first merged point cloud image includes the respective plurality of LiDAR points of the at least two LiDAR point clouds of the first set of LiDAR point clouds;

indicate that the at least two LiDAR point clouds of the first set of LiDAR point clouds are aligned based on the generation of the first merged point cloud image;

indicate that at least two LiDAR point clouds of a second set of LiDAR point clouds of the plurality of sets of LiDAR point clouds are aligned based on generation of a second merged point cloud image;

process the plurality of merged point cloud images using at least one neural network, wherein the at least one neural network was trained by:

obtaining training data comprising at least one first set of merged point cloud images comprising misaligned pairs of LiDAR point clouds and at least one second set of merged point cloud images comprising aligned pairs of LiDAR point clouds, and training, using the training data, the at least one neural network to classify merged point cloud images as having aligned or misaligned LiDAR point clouds;

receive, from the at least one neural network, a first probability corresponding to a likelihood that the at least two LiDAR point clouds of the first set of LiDAR point clouds included in the first merged point cloud image are misaligned;

receive, from the at least one neural network, a second probability corresponding to a likelihood that the at least two LiDAR point clouds of the second set of LiDAR point clouds included in the second merged point cloud image are aligned;

determine that the at least two LiDAR point clouds of the first set of LiDAR point clouds are misaligned based on the first probability;

determine that the at least two LiDAR point clouds of the second set of LiDAR point clouds that are aligned based on the second probability of the plurality of probabilities, the second probability corresponding to the second merged point cloud image; and generate a map using the second merged point cloud image based on the determination that the at least two LiDAR point clouds of the second set of LiDAR point clouds are aligned.

15. The system of claim 14, wherein the at least one neural network comprises at least one of: a pillar-based network or a kernel point convolution-based network.

16. The system of claim 14, wherein the at least one neural network comprises a pillar-based network and a kernel point convolution-based network, wherein to receive the first probability from the at least one neural network, the instructions, when executed by the at least one processor, further cause the at least one processor to: receive a third probability from the pillar-based network and a fourth probability from the kernel point convolution-based network, and wherein to determine that the at least two LiDAR point clouds of the first set of LiDAR point clouds are misaligned the instructions, when executed by the at least one processor, cause the at least one processor to:

weight the third probability from the pillar-based network and the fourth probability from the kernel point convolution-based network based on a confidence value associated with the third probability and a confidence value associated with the fourth probability, fuse the third probability from the pillar-based network and the fourth probability from the kernel point convolution-based network based on the weighting the third probability and the fourth probability, and determining that the at least two LiDAR point clouds of the first set of LiDAR point clouds are misaligned based on fusing the third probability and the fourth probability.

17. The system of claim 14, wherein a first neural network of the at least one neural network is a pillar-based network, wherein the pillar-based network comprises:

a feature network that receives at least one LiDAR point cloud and outputs at least one feature map, at least one functional network that receives the at least one feature map and outputs a feature vector, and a fully connected layer that receives the feature vector and outputs the first probability or the second probability.

18. The system of claim 14, wherein a first neural network of the at least one neural network is a kernel point convolution-based network, wherein the kernel point convolution-based network comprises:

a kernel point convolution-based encoder that receives at least one merged point cloud image and outputs a plurality of feature vectors, an aggregation function that receives the plurality of feature vectors and aggregates the plurality of feature vectors into a single feature vector, and a fully connected layer that receives the single feature vector and outputs the first probability or the second probability.

19. At least one non-transitory storage media storing instructions that, when executed by at least one processor, cause the at least one processor to:

generate a plurality of merged point cloud images based on a plurality of sets of LiDAR point clouds, wherein to generate a first merged point cloud image of the plurality of merged point cloud images, the instructions, when executed by the at least one processor, cause the at least one processor to merge at least two LiDAR point clouds of a first set of LiDAR point clouds of the plurality of sets of LiDAR point clouds, wherein the first merged point cloud image includes respective LiDAR points of the at least two LiDAR point clouds of the first set of LiDAR point clouds;

indicate that the at least two LiDAR point clouds of the first set of LiDAR point clouds are aligned based on the generation of the first merged point cloud image;

indicate that at least two LiDAR point clouds of a second set of LiDAR point clouds of the plurality of sets of LiDAR point clouds are aligned based on generation of a second merged point cloud image;

process the plurality of merged point cloud images using at least one neural network, wherein the at least one neural network was trained by:

obtaining training data comprising at least one first set of merged point cloud images comprising misaligned pairs of LiDAR point clouds and at least one second set of merged point cloud images comprising aligned pairs of LiDAR point clouds, and training, using the training data, the at least one neural network to classify merged point cloud images as having aligned or misaligned LiDAR point clouds;

receive, from the at least one neural network, a first probability corresponding to a likelihood that the at least two LiDAR point clouds of the first set of LiDAR point clouds included in the first merged point cloud image are misaligned;

receive, from the at least one neural network, a second probability corresponding to a likelihood that the at least two LiDAR point clouds of the second set of LiDAR point clouds included in the second merged point cloud image are aligned;

determine that the at least two LiDAR point clouds of the first set of LiDAR point clouds are misaligned based on the first probability;

determine that the at least two LiDAR point clouds of the second set of LiDAR point clouds are aligned based on the second probability; and generate a map using the second merged point cloud image based on the determination that the at least two LiDAR point clouds of the second set of LiDAR point clouds are aligned.

* * * * *